United States Patent
Gyoten et al.

(10) Patent No.: US 10,168,603 B2
(45) Date of Patent: *Jan. 1, 2019

(54) OPTICAL MEMBER DRIVING APPARATUS AND PROJECTION TYPE IMAGE DISPLAY APPARATUS

(71) Applicant: PANASONIC INTELLECTUAL PROPERTY MANAGEMENT CO., LTD., Osaka-shi, Osaka (JP)

(72) Inventors: Takaaki Gyoten, Hyogo (JP); Nobuyuki Kondo, Osaka (JP); Ken Mashitani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/192,751

(22) Filed: Jun. 24, 2016

(65) Prior Publication Data

US 2016/0306269 A1    Oct. 20, 2016

Related U.S. Application Data

(63) Continuation of application No. PCT/JP2014/006484, filed on Dec. 26, 2014.

(30) Foreign Application Priority Data

Dec. 27, 2013    (JP) .................................. 2013-271266

(51) Int. Cl.
*G03B 21/14*    (2006.01)
*G03B 21/20*    (2006.01)
(Continued)

(52) U.S. Cl.
CPC ........... *G03B 21/147* (2013.01); *G02B 26/08* (2013.01); *G02B 26/0875* (2013.01);
(Continued)

(58) Field of Classification Search
CPC .... G03B 21/142; G03B 21/204; G03B 21/14; G03B 21/147; H04N 9/3161; H04N 9/3188; G02B 26/0875; G02B 27/48; G02B 26/08
See application file for complete search history.

(56) References Cited

U.S. PATENT DOCUMENTS 6,235,438 B1    5/2001    Suzuki et al.
2004/0189969 A1*   9/2004   Mizuno .................. G02B 7/023
                                                                      355/67
(Continued)

FOREIGN PATENT DOCUMENTS

JP    56-161506 A    12/1981
JP    4-133414 A    5/1992
(Continued)

OTHER PUBLICATIONS

International Search Report issued in PCT/JP2014/006484 dated Mar. 17, 2015 and corresponding English translation.
(Continued)

*Primary Examiner* — Michael E Teitelbaum
*Assistant Examiner* — Sean N. Haiem
(74) *Attorney, Agent, or Firm* — Hamre, Schumann, Mueller & Larson, P.C.

(57) ABSTRACT

An optical member driving apparatus includes an optical member for changing an optical path, a plurality of actuators each having a movable member which is controlled to move in one direction, a plurality of connecting members which connect edge portions of the optical member positioned on two axes orthogonal to each other and the movable members
(Continued)

of the plurality of actuators, respectively, a position detector for detecting a moving amount of the movable member of each actuator and outputting a detection signal indicating the moving amount, and a controller for controlling movement of the movable member of each actuator based on the detection signal from the position detector so as to keep an intersection point of the two axes at constant position.

10 Claims, 19 Drawing Sheets

(51) Int. Cl.
| | |
|---|---|
| *G02B 26/08* | (2006.01) |
| *G02B 27/48* | (2006.01) |
| *H04N 9/31* | (2006.01) |
| *G02B 26/00* | (2006.01) |

(52) U.S. Cl.
CPC ............ *G02B 27/48* (2013.01); *G03B 21/14* (2013.01); *G03B 21/142* (2013.01); *H04N 9/3111* (2013.01); *H04N 9/3161* (2013.01); *H04N 9/3188* (2013.01); *G02B 26/008* (2013.01); *G03B 21/204* (2013.01); *G03B 2205/0007* (2013.01); *G03B 2205/0053* (2013.01); *G03B 2205/0069* (2013.01)

(56) References Cited

U.S. PATENT DOCUMENTS

| | | | | |
|---|---|---|---|---|
| 2005/0179806 A1* | 8/2005 | Shimizu | ............ | G02B 26/0875 |
| | | | | 348/340 |
| 2006/0244930 A1* | 11/2006 | Hayashi | ............ | G02B 17/0663 |
| | | | | 353/97 |
| 2007/0133091 A1* | 6/2007 | Ito | ........... | G02B 27/646 |
| | | | | 359/554 |
| 2007/0176851 A1* | 8/2007 | Willey | ............. | G02B 26/101 |
| | | | | 345/32 |
| 2010/0060973 A1* | 3/2010 | Olaya | ................ | G02B 26/06 |
| | | | | 359/291 |
| 2011/0134528 A1* | 6/2011 | Suzuka | ............. | G02B 27/646 |
| | | | | 359/554 |
| 2012/0147280 A1* | 6/2012 | Osterman | ............. | G02B 27/26 |
| | | | | 349/9 |
| 2014/0036236 A1* | 2/2014 | Shishido | ............ | G03B 21/142 |
| | | | | 353/31 |

FOREIGN PATENT DOCUMENTS

| | | |
|---|---|---|
| JP | 7-301839 A | 11/1995 |
| JP | 11-121322 A | 4/1999 |
| JP | 2004-281644 A | 10/2004 |
| JP | 2004-301888 A | 10/2004 |
| JP | 2005-229380 A | 8/2005 |
| JP | 2005-266676 A | 9/2005 |
| JP | 2005-275062 A | 10/2005 |
| JP | 2006-23574 A | 1/2006 |
| JP | 2006-308830 A | 11/2006 |
| JP | 2007-10954 A | 1/2007 |
| JP | 2007-206567 A | 8/2007 |
| JP | 2008-83415 A | 4/2008 |
| JP | 2009-265126 A | 11/2009 |

OTHER PUBLICATIONS

International Preliminary Report on Patentability of International Application No. PCT/JP2014/006484, dated Jul. 7, 2016, and English translation of the PCT Written Opinion dated Mar. 17, 2015, total 9 pages.

\* cited by examiner

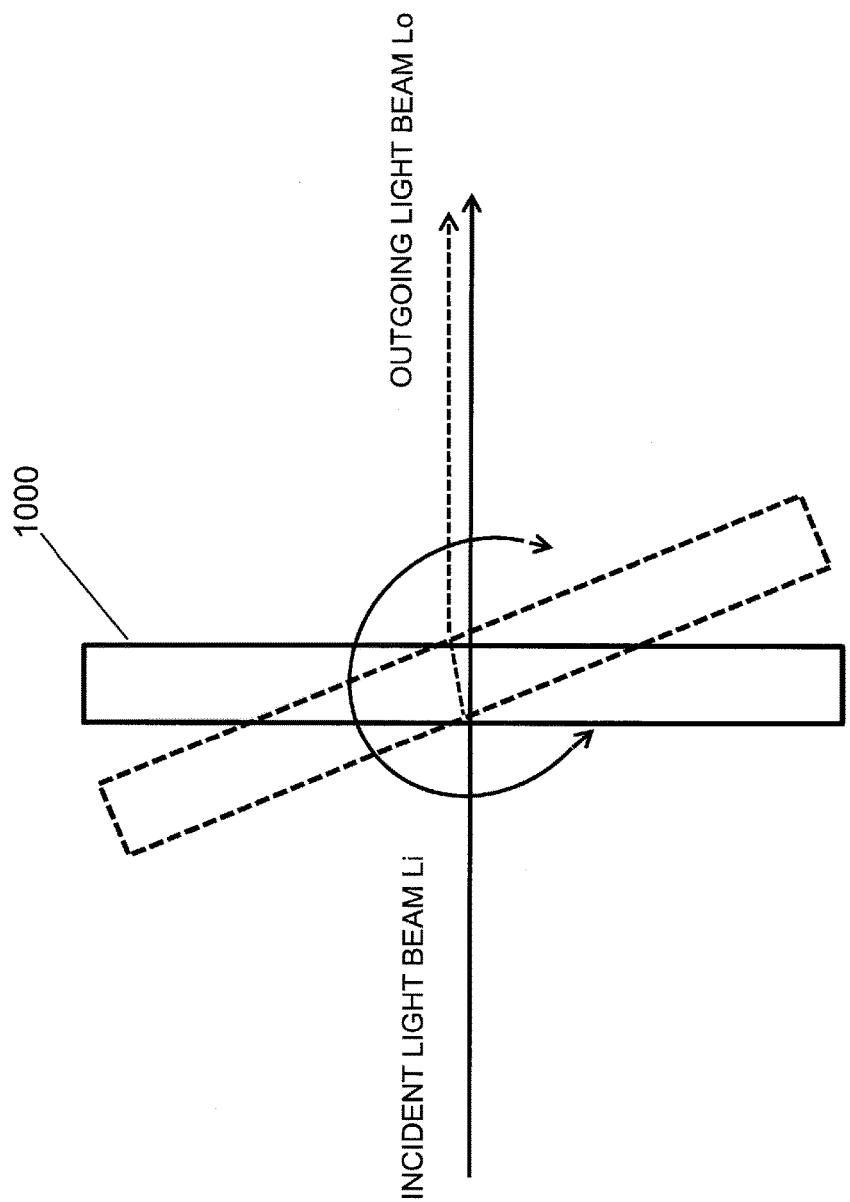

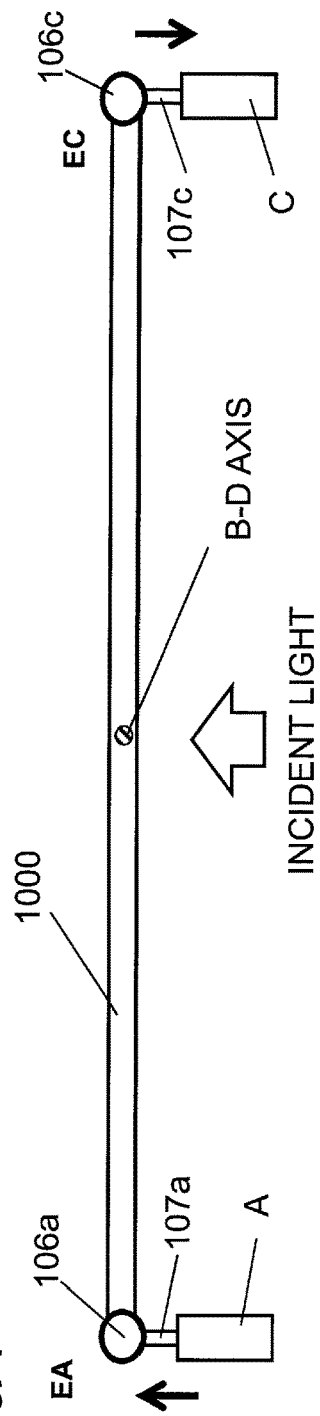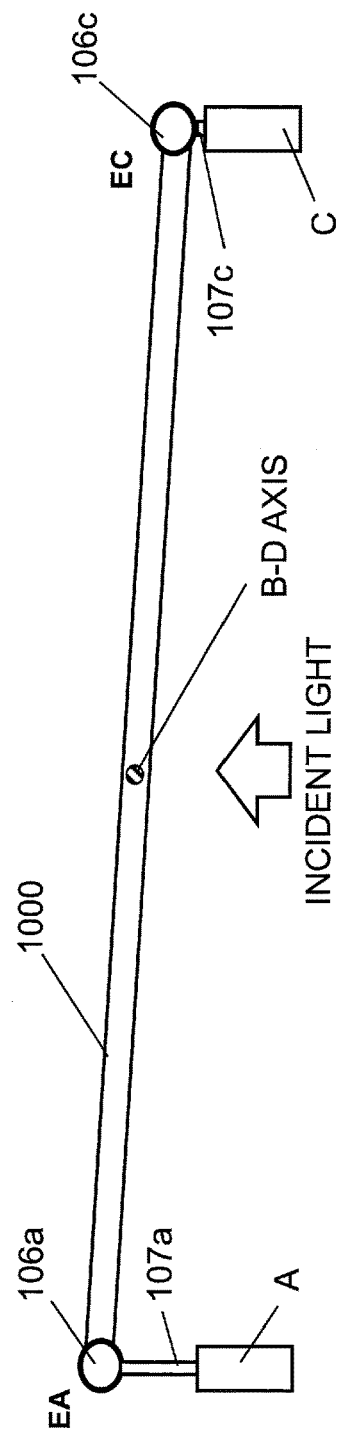
Fig. 6A
Fig. 6B

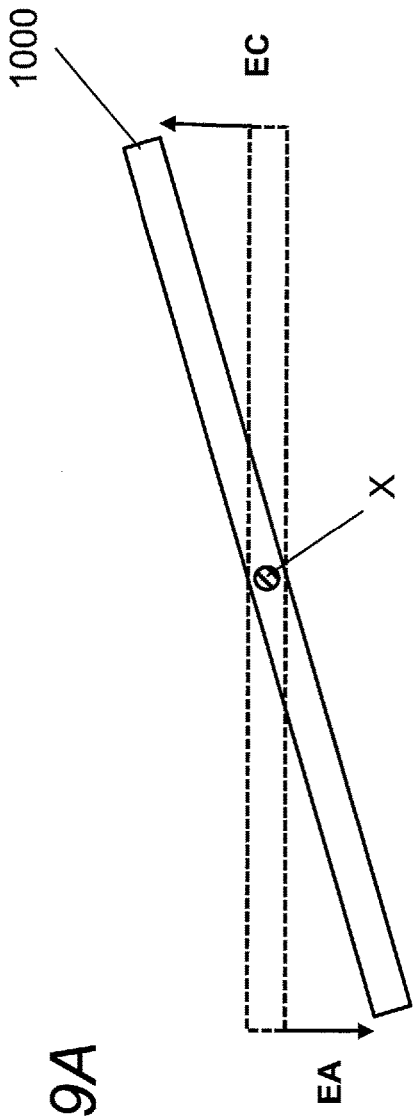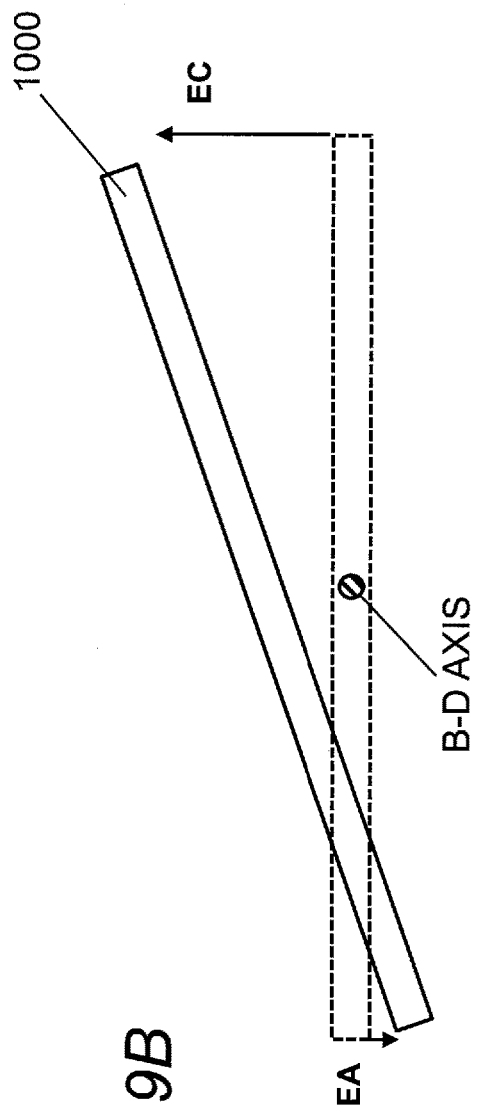

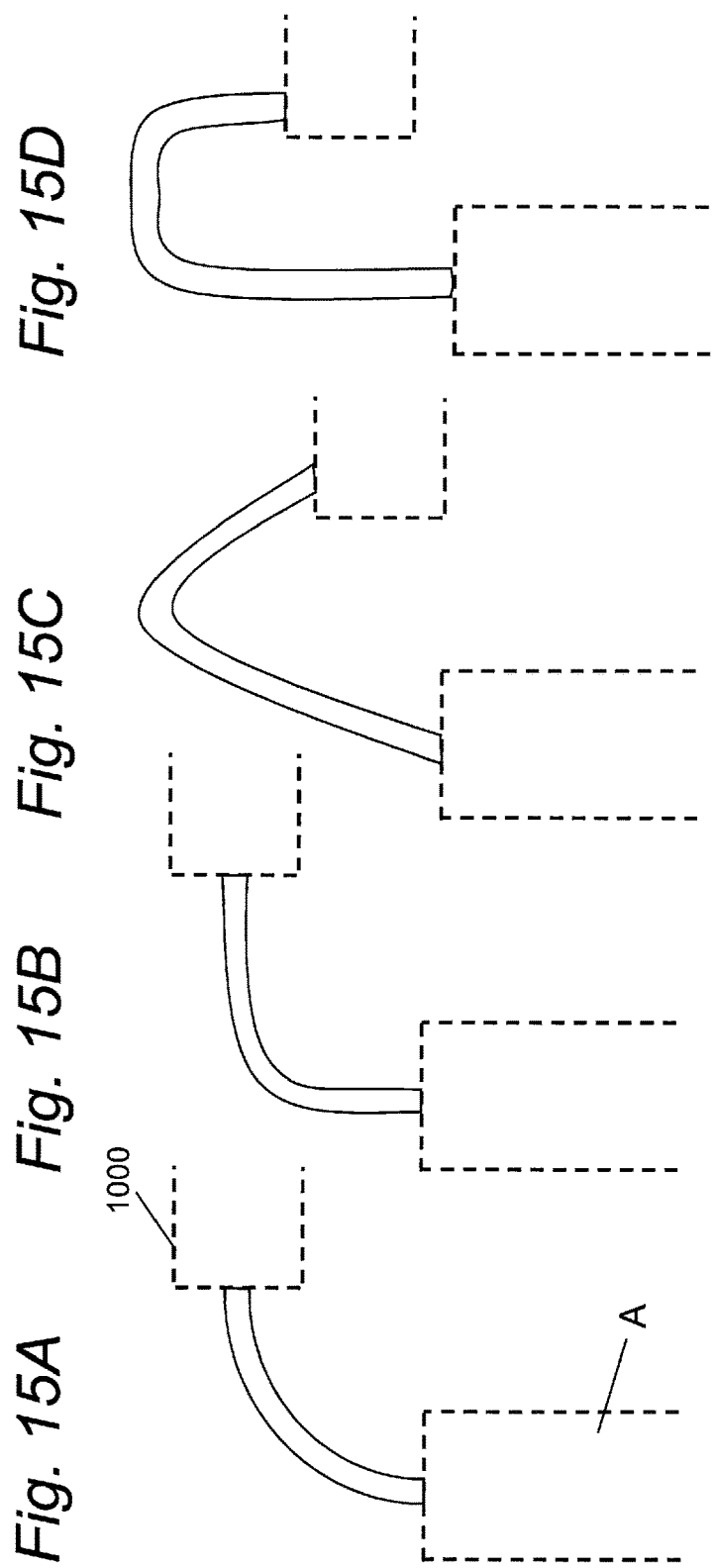

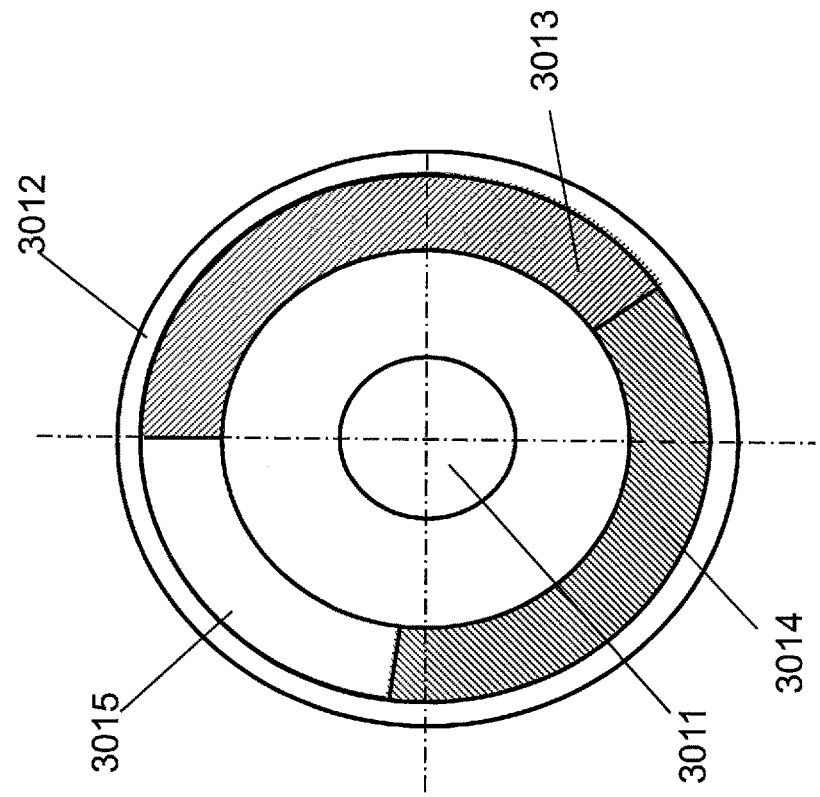
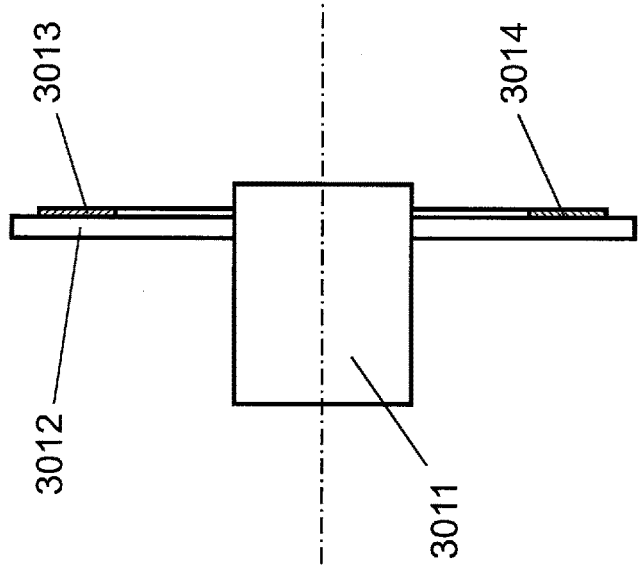
Fig. 19B
Fig. 19A

OPTICAL MEMBER DRIVING APPARATUS AND PROJECTION TYPE IMAGE DISPLAY APPARATUS

CROSS-REFERENCE TO RELATED APPLICATIONS

This is a continuation application of International Application No. PCT/JP2014/006484, with an international filing date of Dec. 26, 2014, which claims priority of Japanese Patent Application No.: JP2013-271266 filed on Dec. 27, 2013, the content of which is incorporated herein by reference.

TECHNICAL FIELD

The present disclosure relates to an optical member driving apparatus for driving optical members for moving a projection position of an image and a projection type image display apparatus using the same.

BACKGROUND

JP 2007-206567 A discloses an image moving apparatus for moving a display position of an image which is projected and displayed by a projector. This image moving apparatus includes piezoelectric elements which support a parallel plate glass at four corners thereof, the piezoelectric elements disposed between a fixed-pixel type display element for optical modulation of an image and the parallel plate glass having a rectangular shape for moving an image position. These four piezoelectric elements are applied with voltage to move the image.

SUMMARY

The image moving apparatus disclosed in JP 2007-206567 A is configured to include the four piezoelectric elements for supporting the parallel plate glass at four corners, the piezoelectric elements being disposed between the fixed-pixel type display element for performing optical modulation of an image and the parallel plate glass having a rectangular shape for moving an image position.

The present disclosure provides an optical member driving apparatus or a projection type image display apparatus which can move an optical member (for example, a parallel plate glass) for moving a projection position of an image (pixels) in two directions orthogonal to each other, with simple control.

In a first aspect of the present disclosure, an optical member driving apparatus is provided, which includes an optical member for changing an optical path, a plurality of actuators each having a movable member which is controlled to move in one direction, a plurality of connecting members which connect edge portions of the optical member positioned on two axes orthogonal to each other and the movable members of the plurality of actuators, respectively, a position detector for detecting a moving amount of the movable member of each actuator and outputting a detection signal indicating the moving amount, and a controller for controlling movement of the movable member of each actuator based on the detection signal from the position detector so as to keep an intersection point of the two axes at constant position.

In a second aspect of the present disclosure, an apparatus is provided, which includes a light source, an optical modulation element for modulating light from the light source by a video image signal, a projection optical system for magnifying and projecting image light modulated by the optical modulation element, and the above-mentioned optical member driving apparatus which is arranged between the optical modulation element and the projection optical system.

The optical member driving apparatus according to the present disclosure can move an image in two directions orthogonal to each other with simple control.

BRIEF DESCRIPTION OF DRAWINGS

FIG. 5 is a drawing for describing a principle of changing an optical path by means of the parallel plate glass.

FIGS. 6A and 6B are drawings for describing an operation of inclining the parallel plate glass according to Embodiment 1.

FIGS. 9A and 9B are drawings for describing states of displacement of the parallel plate glass.

FIGS. 15A to 15D are drawings showing other examples of connecting members of the optical member driving apparatus.

FIGS. 19A and 19B are drawings showing a configuration of a phosphor wheel.

DESCRIPTION OF EMBODIMENTS

With reference to the drawings as necessary, embodiments are described below in detail. However, an unnecessarily detailed description may be omitted. For example, a detailed description of an already well-known matter or a duplicate description of a substantially same configuration may be omitted. Such omission is intended to avoid the following descriptions from being unnecessarily redundant and to facilitate easy understanding by a person skilled in the art.

The inventor(s) provide the accompanying drawings and the following description for those skilled in the art to help them to fully understand the present disclosure and do not intend to limit the subject described in the claims by the accompanying drawings or the following description.

Embodiment 1

With reference to the accompanying drawings, embodiments are described below.

1-1. Configuration

Figure 1:
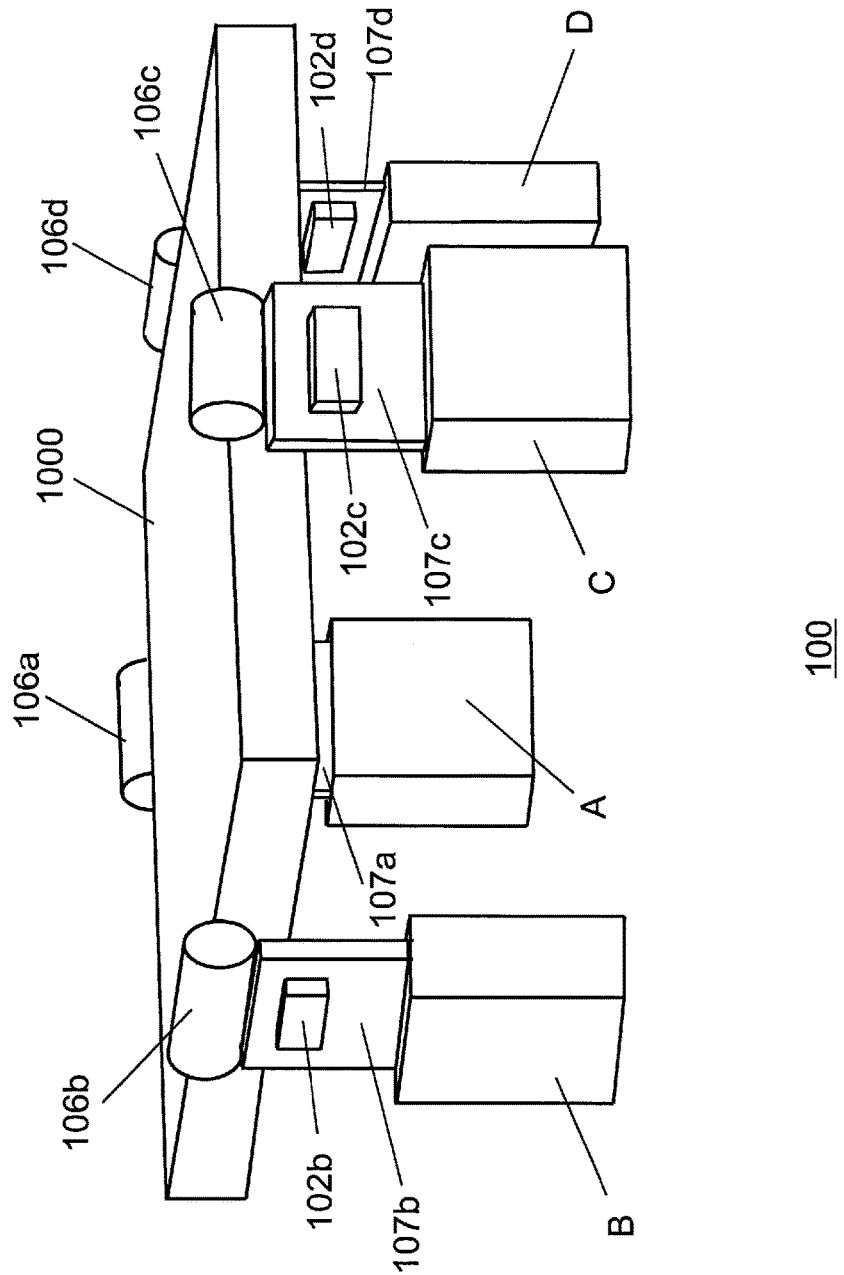
FIG. 1 is a block diagram showing an overall configuration of an optical member driving apparatus according to Embodiment 1.
Figure 2:
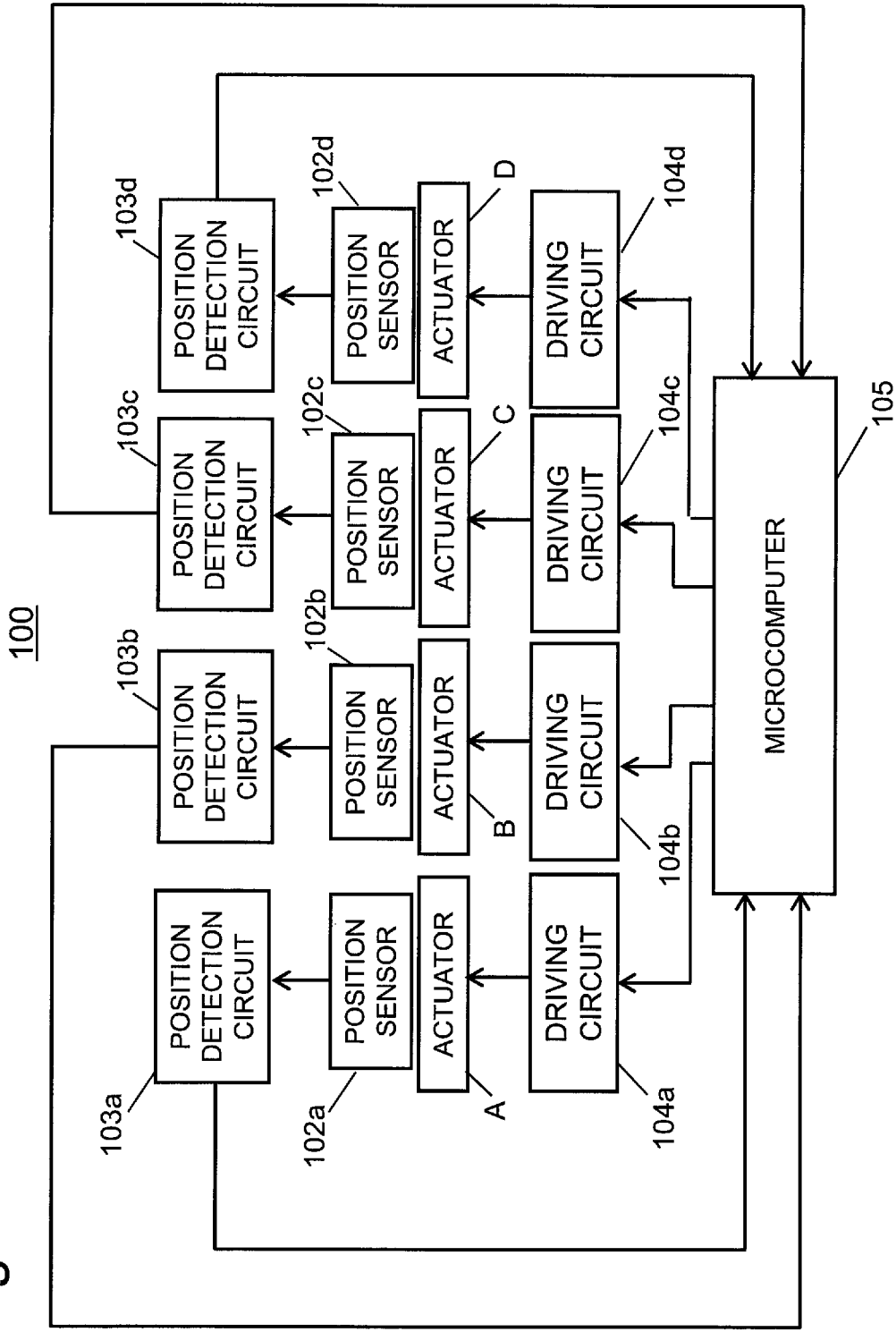
FIG. 2 is a diagram showing a configuration of the optical member driving apparatus according to Embodiment 1.

FIG. 1 is a perspective view showing a configuration of an optical member driving apparatus for driving an optical member according to the present embodiment. FIG. 2 is a block diagram showing a configuration of a driving unit for driving the optical member driving apparatus 100 as shown in FIG. 1.

As shown in FIG. 1, the optical member driving apparatus 100 includes a square parallel plate glass 1000 which is an example of an optical member, four actuators A, B, C, and D for driving the parallel plate glass 1000, and connecting members 106a, 106b, 106c, and 106d which connect the actuators A, B, C, and D to the parallel plate glass 1000, respectively. Edge portions of the square parallel plate glass 1000 are connected to movable members 107a, 107b, 107c, and 107d of the actuators A, B, C, and D through the connecting members 106a, 106b, 106c, and 106d, respectively.

Figure 3:
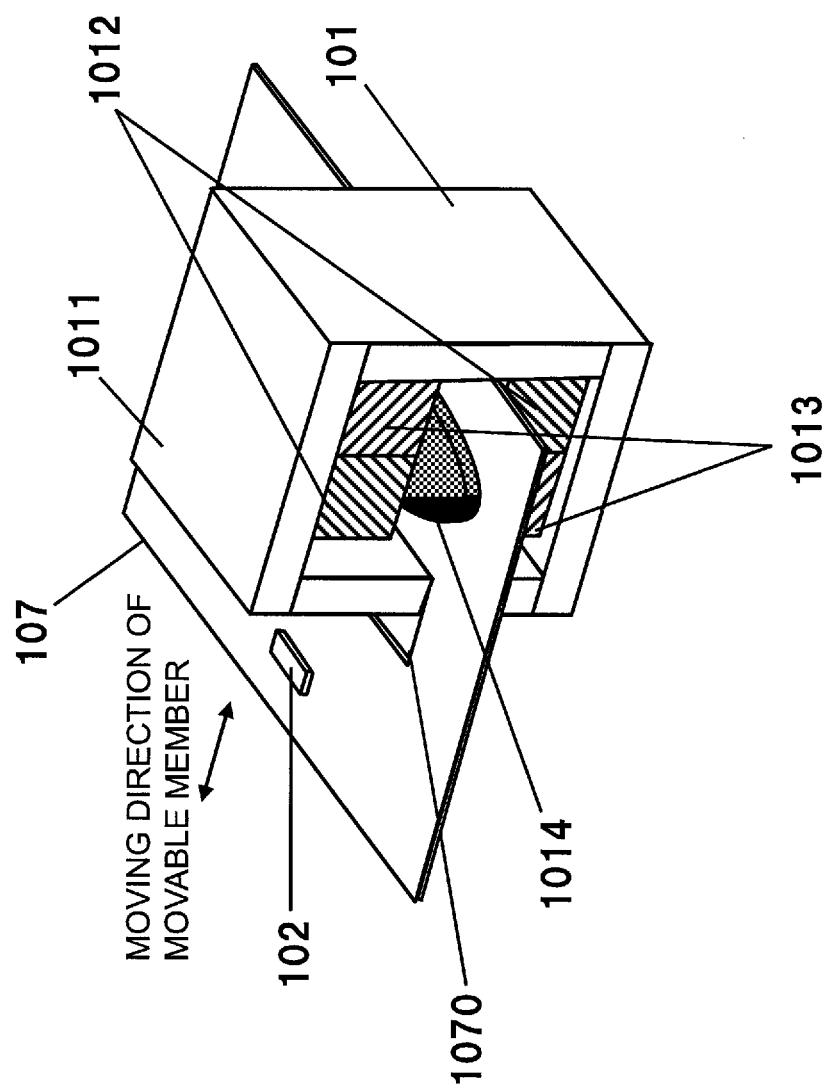
FIG. 3 is schematic view of components used in the optical member driving apparatus according to Embodiment 1.

In the present embodiment, a voice coil motor (VCM) is used as each of the actuators A to D. FIG. 3 shows one example of a configuration of the voice coil motor, in which permanent magnets each having different magnetic poles (the north pole portion 1012 and the south pole portion 1013) are arranged within a yoke 1011, with the permanent magnets separated from each other with a fixed distance and facing each other. A movable member 107 is arranged between the permanent magnets facing each other.

The movable member 107 is provided with a guide window 1070. The yoke 1101 is inserted into the guide window 1070, and a coil 1014 mounted on the movable member 107 is disposed between the permanent magnets each including north and south pole portions 1012 and 1013 which are arranged facing each other. When a driving signal current flows through the coil 1014, the movable member 107 moves in a direction (uniaxial direction) indicated by an arrow. A moving amount of the movable member 107 changes in accordance with magnitude of the signal current which flows through the coil 1014, and the movable member 107 moves from a reference position in a positive direction or a negative direction. The moving amount of the movable member 107 is detected by a position detection circuit 103 as shown in FIG. 1 based on a signal from a position sensor 102 attached to the movable member 107. A small gap is formed between the movable member 107 having the coil 1014 attached thereto and the permanent magnets each including north and south pole portions 1012 and 1013. Therefore, when the movable member 107 is applied with a force in a direction perpendicular to one direction in which the movable member 107 is driven by the driving signal current, the movable member 107 shifts by a distance which is allowable in the small gap. In the voice coil motor, magnets with large mass may be fixed and a light weight coil may be used in the movable member so that a moment can be reduced.

Figure 4:
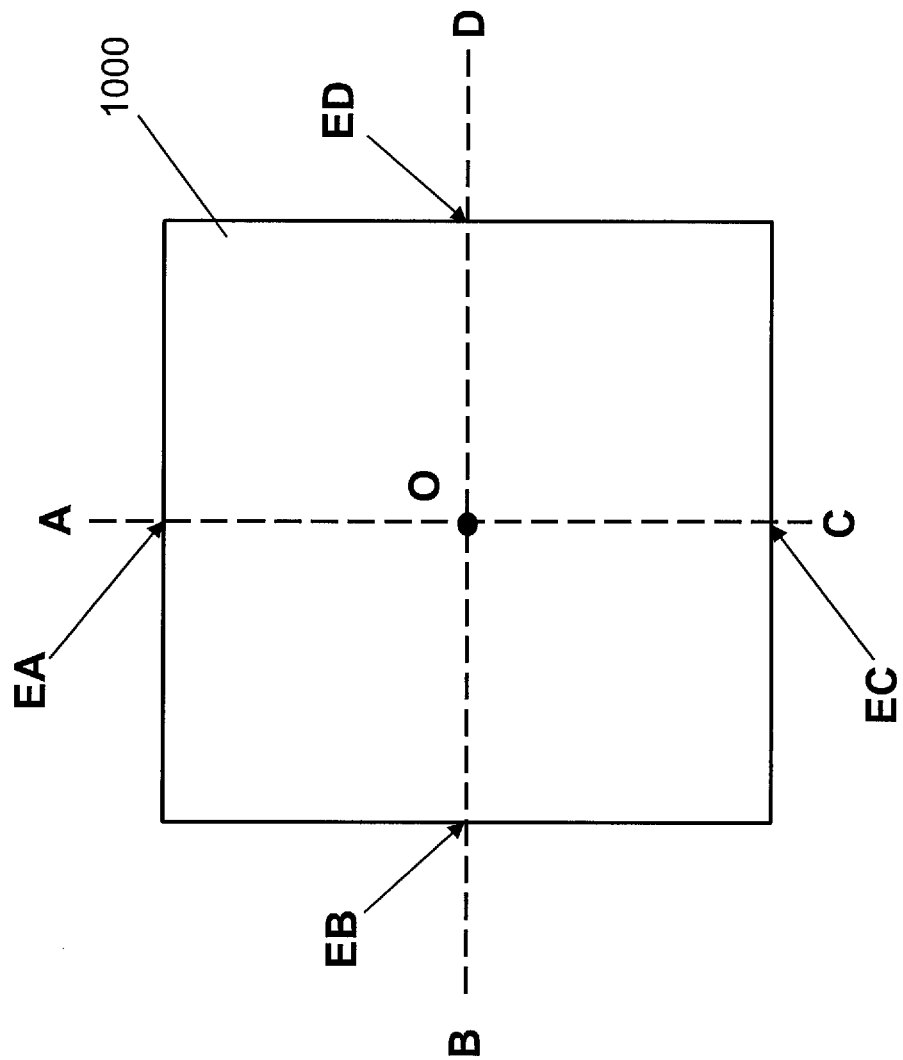
FIG. 4 is a plan view of a parallel plate glass used in the optical member driving apparatus according to Embodiment 1.

As shown in FIG. 4, each connecting member 106, to which each movable member 107 of the actuators A to D is connected, is connected to the parallel plate glass 1000 at a middle portion (EA, EB, EC, ED) of the corresponding edge of the circumference of the parallel plate glass 1000. An imaginary line connecting a point EA and a point EC which support the parallel plate glass 1000 is assumed as an A-C axis, and an imaginary line connecting a point EB and a point ED is assumed as a B-D axis. The A-C axis and the B-D axis orthogonally intersect with each other at a surface center position O of the parallel plate glass 1000. In other words, the actuators A and C are arranged on the A-C axis and at the edge portions EA and EC of the parallel plate glass 1000, respectively, such that the actuators A and C faces each other. The actuators B and D are arranged on the B-D axis and at the edge portions EB and ED of the parallel plate glass 1000, respectively, such that the actuators B and D face each other.

The four actuators A, B, C, and D are driven by driving circuits 104a, 104b, 104c, and 104d, respectively. Each of the driving circuits 104a, 104b, 104c, and 104d is controlled by a control signal from a single microcomputer 105. The actuators A to D are driven by the driving signal current from the driving circuits 104a to 104d to move the movable members 107a to 107d forwardly and backwardly in one direction (in a direction parallel to a light axis). The positions of the movable members 107a to 107d are detected by the position detection circuits 103a to 103d based on the signals from the position sensors 102a to 102d mounted on the movable members, respectively. The position detection circuits 103a to 103d amplify the signals from the position sensors 102a to 102d by a predetermined gain to generate detection signals, respectively. Each of the detection signals from the position detection circuits 103a to 103d is inputted to the microcomputer 105. The microcomputer 105 continuously monitors each of the positions (or the moving amounts) of the movable members 107a to 107d of the actuators A to D and performs a servo-control of each of the actuators A to D.

1-2. Operation

Operation of the optical member driving apparatus 100 configured as above is described below.

FIG. 5 is a drawing for explaining changing of an optical path by inclination of the parallel plate glass 1000. When a principal surface of the parallel plate glass 1000 is orthogonal to an input light beam Li as depicted by a solid line in FIG. 5, the input light beam Li is not refracted at an incident surface of the parallel plate glass 1000 and passes straight through the parallel plate glass 1000. Then, on an outgoing surface of the parallel plate glass 1000, since the light beam and the outgoing surface are orthogonal to each other, the input light beam Li travels without being refracted. Accordingly, in a case where the input light beam is a image light, no movement of an image (pixels) occurs.

On the other hand, when the parallel plate glass 1000 is not orthogonal to the input light beam Li as depicted by a dashed line in FIG. 5, the input light beam Li is refracted by the incident surface of the parallel plate glass 1000 and passes straight through the parallel plate glass 1000, and then the input light beam Li is refracted at the outgoing surface and goes out therefrom.

An angle of the refraction caused when the incident light beam Li enters into the parallel plate glass 1000 are equal to an angle of the refraction caused when the incident light beam Li goes out from the parallel plate glass 1000. Accordingly, in a case where the incident light beam Li is an image light, the image light, which is an outgoing light beam Lo, is shifted parallelly in accordance with the inclination of the parallel plate glass 100. As a result, the display position of a projected image outputted from the parallel plate glass 1000 is moved.

FIGS. 6A and 63 are drawings for describing a principle of a method for inclining the parallel plate glass 1000. The parallel plate glass 1000 is moved, starting from a state as shown in FIG. 6A, for example, by shifting the movable member 107*a* of the actuator A upward, and shifting the movable member 107*c* of the actuator C downward by the same shifting amount as those of the movable member 107*a* of the actuator A, while not shifting the movable members of the actuator B and actuator D. As a result, the parallel plate glass 1000 can be shifted about the B-D axis as a center as shown in FIG. 6B. Namely, each actuator of a pair of the actuators which are disposed across the parallel plate glass 1000 and faces each other, are shifted in opposite direction to each other by the same moving amount, thereby inclining the parallel plate glass 1000.

By the use of such a principle, the actuators A to C can incline the parallel plate glass 1000 so that the incident image light can be moved and projected onto a plurality of different positions.

FIG. 7 and FIGS. 8A to 8E are drawings for describing control of the actuators A to C for inclining the parallel plate glass 1000.

Figure 7:
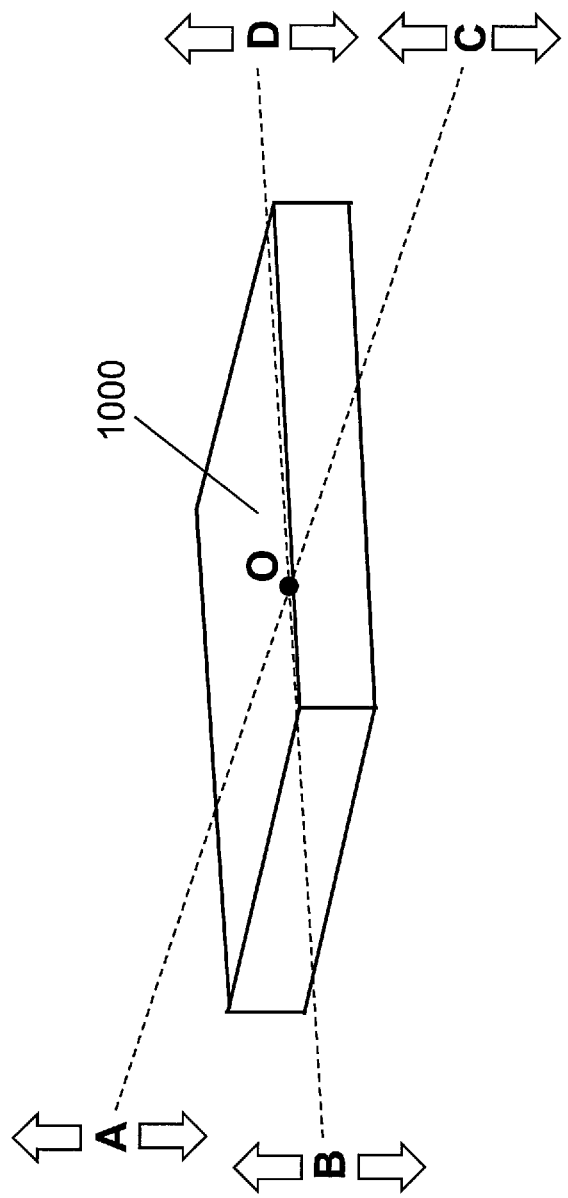
FIG. 7 is a drawing showing directions of inclining driving of the parallel plate glass.

As shown in FIG. 7, the A-C axis and the B-D axis orthogonally intersect with each other at the surface center position O on the same surface. By inclining the A-C axis and/or the B-D axis with the intersection point O kept at a constant position, it is possible to incline the parallel plate glass 1000 to change display positions of pixels two-dimensionally. With reference to 8A to 8E, operation of the actuators A to C for moving a display position of a pixel is described below.

Figure 8A:
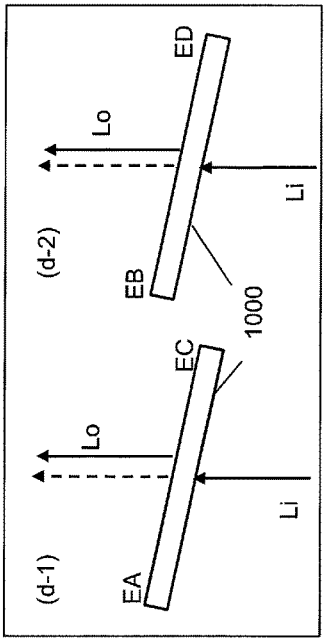
FIGS. 8A to 8E are drawings for describing a principle of emitting input image light to a plurality of positions by means of the parallel plate glass.
Figure 8D:
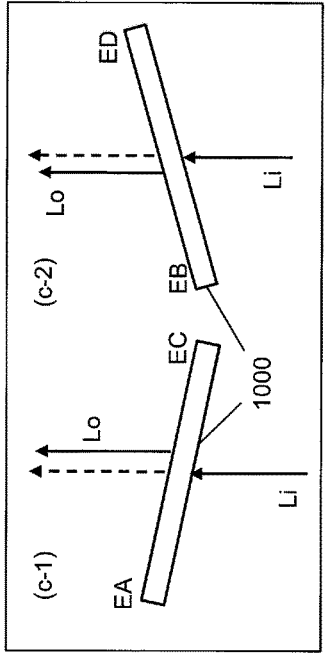
Figure 8E:
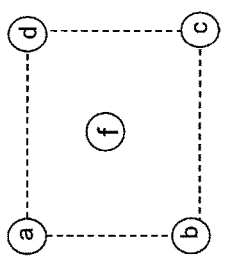

FIGS. 8A to 8E are drawings for describing the operation of the actuators A to C for moving a display position of a pixel. FIGS. 8A to 8D are drawings for describing controlled states of the parallel plate glass 1000. FIG. 8E is a drawing showing a display position of a pixel which is moved in accordance with inclining of the parallel plate glass 1000.

In FIGS. 8A to 8D, the dashed line arrow indicates an outgoing light beam when an incident light beam Li perpendicularly enters the parallel plate glass 1000, in other words, when the parallel plate glass 1000 is positioned horizontally. When the incident light beam is an image light, it is assumed that the outgoing light beam Lo is displayed as a pixel at a position indicated by "f" shown in FIG. 8E. Hereinafter, this state is referred to as a "reference state". By driving each actuator A to C, it is possible to incline the parallel plate glass 1000 such that the display position of the pixel can be shifted to each of the positions of "a" to "d".

The position "a" shown in FIG. 8E indicates a position of the pixel displayed when the parallel plate glass 1000 is driven in a state (first state) as shown in FIG. 8A. Namely, in the first state, as shown in FIG. 8A (a-1), the actuator C moves upwardly the point EC, and the actuator A moves downwardly the point EA by the same amount as the moving amount of the point EC. Simultaneously, as shown in FIG. 8A(a-2), the actuator D moves the point ED downwardly, and the actuator B moves the point EB upwardly by the same amount as the moving amount of the point ED. By this movement, the pixel can be displayed at the position "a" shown in FIG. 8E.

Figure 8B:
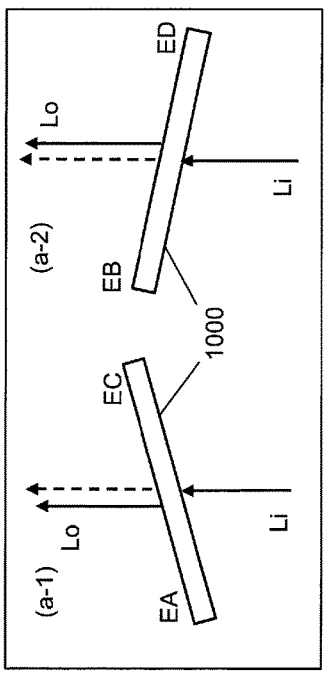

The position "b" shown in FIG. 8E indicates a position of the pixel displayed when the parallel plate glass 1000 is driven in a state (second state) as shown in FIG. 8B. Namely, in the second state, as shown in FIG. 8B(b-1), the actuator C moves upwardly the point EC, and the actuator A moves downwardly the point EA by the same amount as the moving amount of the point EC. Simultaneously, as shown in FIG. 8B(b-2), the actuator D moves the point ED upwardly, and the actuator B moves the point EB downwardly by the same amount as the moving amount of the point ED. By this movement, the pixel can be displayed at the position "b" shown in FIG. 8E.

Figure 8C:
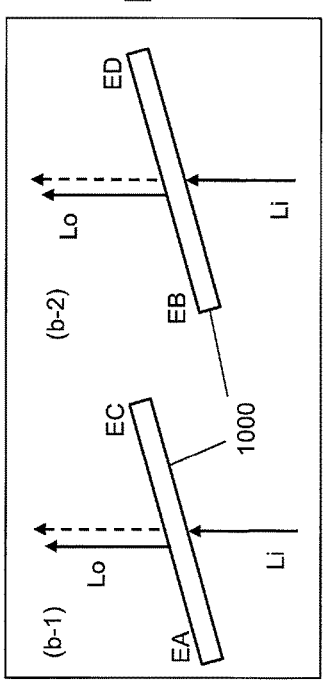

The position "c" shown in FIG. 8E indicates a position of the pixel displayed when the parallel plate glass 1000 is driven in a state (third state) as shown in FIG. 8C. Namely, in the third state, as shown in FIG. 8C (c-1), the actuator C moves downwardly the point EC, and the actuator A moves upwardly the point EA by the same amount as the moving amount of the point EC. Simultaneously, as shown in FIG. 8C (c-2), the actuator D moves the point ED upwardly, and the actuator B moves the point EB downwardly by the same amount as the moving amount of the point ED. By this movement, the pixel can be displayed at the position "c" shown in FIG. 8E.

The position "d" shown in FIG. 8E indicates a position of the pixel displayed when the parallel plate glass 1000 is in a state (fourth state) as shown in FIG. 8D. Namely, in the fourth state, as shown in FIG. 8D (d-1), the actuator C moves downwardly the point EC, and the actuator A moves upwardly the point EA by the same amount as the moving amount of the point EC. Simultaneously, as shown in FIG. 8D (d-2), the actuator D moves downwardly the point ED, and the actuator B moves upwardly the point EB by the same amount as the moving amount of the point ED. By this movement, the pixel can be displayed at the position "d" shown in FIG. 8E.

By inputting the image light to the parallel plate glass at the time when the parallel plate glass 1000 is in one of the first to fourth states, the pixel can be displayed at one of the four different positions indicated by "a" to "d" shown in FIG. 8E.

Here, a shifting amount of a movable member of an actuator (hereinafter, simply referred to as a "shifting amount of an actuator") may include an error caused due to factors such as a limit of accuracy of a position sensor, even if control is performed with the same target shifting amount.

When the actuator A and actuator C are driven with the actuator B and actuator D not being shifted, in a normal state, the shifting amount of the actuator A in a downward direction and the shifting amount of the actuator C in a upward direction are equal to each other, as shown in FIG. 9A. Therefore, the intersection point of the A-C axis and the B-D axis is located at a predetermined reference position.

However, due to factors such as variations of the actuators or variations in attached positions of the actuators, each of the actuator A and the actuator C may shift by different shifting amount (for example, the shifting amount of the actuator C in the upward direction is larger than the shifting amount of the actuator A in the downward direction) in a state that the actuator B and actuator D are not shifted, as shown in FIG. 9B. In this case, a load is ununiformly applied to the parallel plate glass 1000. In some cases, the parallel plate glass 1000 may be deformed, and the A-C axis and the B-D axis do not intersect with each other as shown in FIG. 9B.

In this state, due to the difference in the shifting amount between the actuator A and actuator C, in relation to the positions of the movable members 107b, 107d of the actuators B, D attached to the parallel plate glass 1000, the actual positions of the movable members 107b, 107d is different from right positions to which the movable members 107b, 107d should be controlled, respectively.

In this case, in order to perform control for moving the parallel plate glass 1000 to the right position, the microcomputer 105 controls the four actuators A to D to generate large driving power. As a result, large strain stress occurs in the parallel plate glass 1000.

The optical member driving apparatus 100 according to the present disclosure has a configuration in which the single microcomputer 105 controls the four actuators A to D. By this configuration, when there is a possibility that stationary and large driving output power supplied to the actuators A to D are generated since the actuators facing to each other attempt to shift by different shifting mount as shown in FIG. 9B, the microcomputer 105 detects in advance large driving output power, and performs a process of correcting a position error of the actuators based on the detection result to suppress the generation of large driving power.

Process for correcting the position error of the actuators in the optical member driving apparatus 100 according to the present disclosure is described as follows.

Figure 10:
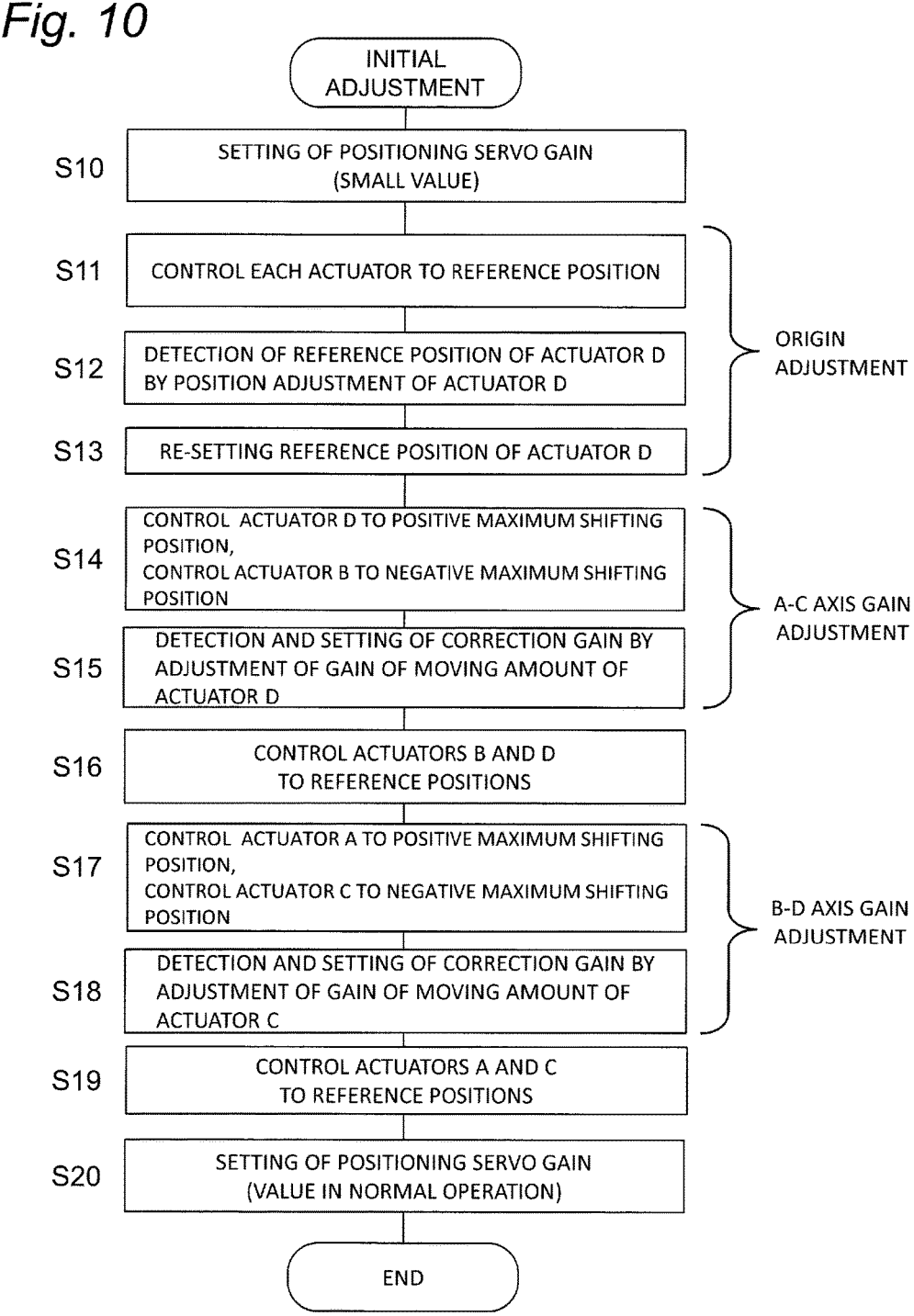
FIG. 10 is a flowchart showing an initial adjustment of actuators.

Before the normal driving operation as described above with reference to FIGS. 8A to 8E, the optical member driving apparatus 100 performs initial adjustment process for the actuators as follows. The initial adjustment process includes three process stages including origin adjustment, A-C axis gain adjustment, and B-D axis gain adjustment. With reference to FIG. 10, the initial adjustment process performed by the optical member driving apparatus 100 is described bellow. The initial adjustment process is started when the power of the optical member driving apparatus 100 is turned ON. Alternatively, the initial adjustment process may be started at other timings or triggered by other events (such as an instruction by a user). The initial adjustment process shown in FIG. 10 is performed by the microcomputer 105. In the following descriptions, the positions of the actuators A to D refers to the positions of the movable members 107a to 107d of the actuators A to D detected by the position sensors 102a to 102d, respectively.

When the power of the optical member driving apparatus 100 is turned ON, the gain of the positioning servo of each actuator is set to a value smaller than a gain in a normal operation (S10). By setting the gain to smaller value, occurrence of excessive driving power of each actuator A to D can be suppressed, even when the reference position (reference position is a position of an actuator when its shifting amount is zero) and the gain are different for each actuator A to D and a displacement between the A-C axis and the B-D axis occurs.

Figure 11:
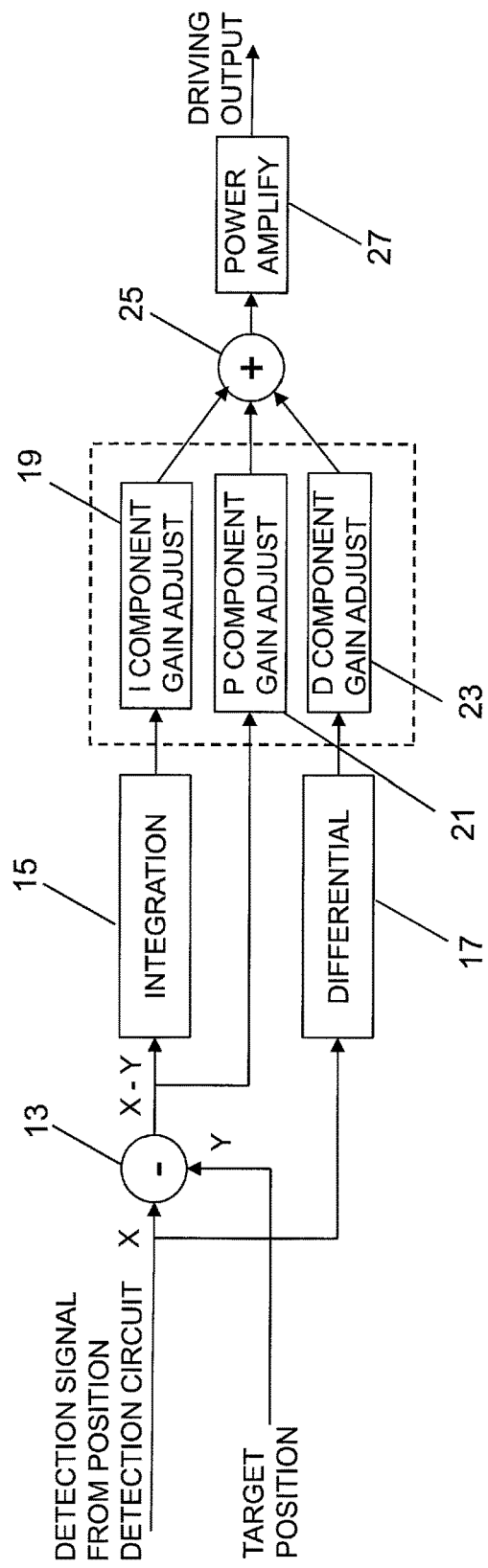
FIG. 11 is a block diagram showing servo control for an actuator.

A "positioning servo of an actuator" refers to a servo control for moving the movable member 107a to 107d of an actuator to a target position. The positioning servo of an actuator is described bellow. FIG. 11 is a block diagram with respect to a servo control to each actuator A to D in the optical member driving apparatus 100 according to the present embodiment.

In a servo control, the position of each actuator is controlled based on a target position and the detection signal from each position detection circuit 103a to 103d, such that the difference between the target position and the detection signal is minimized. Namely, the detection signal from each position detection circuit 103a to 103d and a signal indicating the target position are inputted into a subtractor 13 to determine the difference therebetween (hereinafter, referred to as "P component signal"). This P component signal is inputted into a P component gain adjuster 21 and its gain is adjusted. In addition, the P component signal is inputted into an integrator 15 and is integrated. The integrated signal is referred to as an "I component signal". The I component signal is inputted into an I component gain adjuster 19 to adjust its gain. In addition, an output signal from each position detection circuit 103a to 103d is differentiated by a differentiator 17. The differentiated signal (signal in which a velocity component is detected) is referred to as a "D component signal". The D component signal is inputted into a D component gain adjuster 23 and its gain is adjusted. The I component signal, the P component signal, and the D component signal for which the gains are adjusted are added, and the result of the addition is amplified by a power amplifier 27. Then each actuator A to D is driven based on the amplified signal.

A setting of a positioning servo gain to a small value in Step S10 is achieved by setting each gain of all of the I component, the P component, and the D component to a small value. Gains of the moving amounts of the actuators determined in Steps S15 and S18, which are described later, correspond to the gains of the position detection circuits 103a to 103d.

Referring back to FIG. 10, after the setting of the gains of the positioning servos (S10), the origin adjustment (adjustment of reference position) is performed. More precisely, the target position of each of the actuators A to D is set to a value (setting value of the reference position) indicating a position with a shifting amount of zero and the actuators A to D are controlled to move to the reference positions (S11). Subsequently, the position of either one of the actuators is adjusted such that its driving power is minimized (S12).

When there is a variation in the attached position or an error of the reference position of each actuator, the points EA, EB, EC, and ED which are connecting positions of the respective actuators, are theoretically not located on the same plane. However, due to the rigidity of the parallel plate glass 1000, the points EA, EB, EC, and ED are actually located on the same plane. Therefore, there is a problem that, when the target position of each actuator A to C is controlled to the reference position in a state that variations and so on exist, loads are applied to the actuators A to D and the driving power of each actuator A to D becomes high.

To solve this problem, the optical member driving apparatus 100 according to the present disclosure first controls the four actuators A to D to the reference positions, and then, the optical member driving apparatus 100 detects a target position at which the driving power of the actuator D is minimized while adjusting the target position of one actuator D among the four actuators A to D.

The driving power of the actuator is proportional to the driving current supplied to the actuator. Since the microcomputer 105 determines the magnitude of the driving current supplied to each actuator, the microcomputer 105 can recognize the driving power of each actuator based on the magnitude of the driving current.

The value of the target position detected as above is re-set as a setting value of the reference position of the actuator D (S13). By this adjustment, the reference positions of all of the actuators A to D are also theoretically located in the same plane. In Steps S12 and S13, the actuator D is adjusted, however the position of either one of the actuators A, B, and C may be adjusted. Namely, any one position of the actuators A to D may be adjusted.

By performing the origin adjustment as described above, variation and so on in the attached position of the actuators can be absorbed.

After the origin adjustment, adjustment of the gains of the moving amounts of the actuators is performed. More precisely, the target position of the actuator D is set to a maximum value in the positive direction and the target position of the actuator B is set to a maximum value in a negative direction, and further, each of the actuators D and B is controlled to the set target position (S14). Namely, the actuator D and the actuator B are moved in opposite directions to each other by the same moving amount (absolute value).

When there is a difference between the detection sensitivity of the position sensor 102d and the position sensor 102b, which detect the moving amounts from the reference positions, of the actuator B and the actuator B, even if the actuators D and B are controlled to the same target position, the moving amount directed to the actuator D is different from the moving amount directed to the actuator B. Therefore, according to the present embodiment, the gain of the position detection circuit 103d (the gain of the moving amount of the actuator D) is adjusted such that the moving amounts which are actually directed to the actuator B and actuator D with respect to the same target position are coincide with each other.

Namely, subsequent to Step S14, the gain (the gain of the position detection circuit 103d) of the moving amount of the actuator D is adjusted such that the actual moving amounts (absolute values) of the actuator D and the actuator B coincide with each other (S15) (this is referred to as "A-C axis gain adjustment"). More precisely, only the moving amount of the actuator D detected by the position sensor 102d is multiplied by α (the gain of the position detection circuit 103d) such that actual moving amounts (absolute value) of the actuator D and the actuator B coincide with each other in a state that the actuator D and the actuator B are controlled to move by the same moving amount in a opposite direction.

In a state that the movable member of each actuator is moved by the same moving amount when each actuator is controlled to the same target position, the actuator D and the actuator B apply no stress to the actuator A and the actuator C. In other words, the driving power of the actuator A and the actuator C is minimized. In view of this, the present embodiment detects a gain (correction gain) of the moving amount of the actuator D while minimizing driving power of the actuator A and the actuator C.

More precisely, in a state that the target position of the actuator D is set to a maximum value in the positive direction and the target position of the actuator B is set to a maximum value in the negative direction, the driving power of the actuator A and the actuator C is determined while the gain (namely, the gain of the position detection circuit 103d) of the moving amount of the actuator D is varied. Then, a gain of the moving amount of the actuator D (namely, the gain of the position detection circuit 103d) which minimizes a difference between a first total driving power and a second total driving power is detected as a correction gain (S15). The first total driving power is sum of the driving power of the actuator A and the driving power of the actuator C before the actuators B and D are controlled to a position with a maximum shifting amount. The second total driving power is sum of the driving power of the actuator A and the driving power of the actuator C when the actuators B and D are controlled to a position with a maximum shifting amount and when the gain of the moving amount of the actuator D is adjusted.

The correction gain detected in the above way is set as a gain of the moving amount of the actuator D. Thereafter, in the normal operation, the gain set as above is applied as a gain of the moving amount of the actuator D (the gain of the position detection circuit 103d). Subsequently, the positions of the actuator D and the actuator B are controlled to the reference positions (S16).

Then, gain adjustment with respect to the B-D axis is also performed. First, the target position of the actuator A is set to a maximum value in the positive direction and the target position of the actuator C is set to a maximum value in the negative direction, and then each of the actuators A and C is controlled to the corresponding set target position (S17). Namely, in a state of being used, for the actuator A and the actuator C, the moving amount is set to have the same absolute value and opposite direction.

When there is a difference in the detection sensitivity between the position sensor 102a and the position sensor 102c, the moving amount directed to the actuator A is made different from the moving amount directed to the actuator C, for the same target position. For this reason, when the actuator A and the actuator C are controlled toward the same target position, the gain of the moving amount of the actuator C (the gain of the position detection circuit 103c) is adjusted such that the moving amounts actually directed to the actuator A and the actuator C coincide with each other (this adjustment is referred to as a "B-D axis gain adjustment"). Namely, this adjustment is performed by multiplying only the moving amount of the actuator C detected by the position sensor 102c by α (the gain of the position detection circuit 103c) in a state that the actuator A and the actuator C are controlled to the same moving amount in opposite direction to each other.

More precisely, in a similar manner as the case of the A-C axis gain adjustment, in a state that the actuator A is controlled to a maximum value in the positive direction and the target position of the actuator C is controlled to a maximum value in the negative direction, the driving power of the actuator B and the actuator D is determined while the gain (namely, the gain of the position detection circuit 103c) of the moving amount of the actuator C is varied. Then, a gain of the moving amount of the actuator C (namely, the gain of the position detection circuit 103c) which minimizes a difference between a first total driving power and a second total driving power is detected as a correction gain (S18). The first total driving power is sum of the driving power of the actuator B and the driving power of the actuator D before the actuators A and C are controlled to the position with a maximum shifting amount. The second total driving power is sum of the driving power of the actuator B and the driving power of the actuator D when the actuators A and C are controlled to the position with a maximum shifting amount and when the gain of the moving amount of the actuator C is adjusted.

The correction gain detected in this way is set as a gain of the moving amount of the actuator C. Thereafter, in the normal operation, this gain set as above is applied as a gain of the moving amount of the actuator C (the gain of the position detection circuit 103c). By the A-C axis gain adjustment and the B-D axis gain adjustment, influence of variation in the detection sensitivity of the position sensors 102a to 102d can be reduced.

When the above-mentioned A-C axis gain adjustment and the B-D axis gain adjustment are completed, a positioning servo gain is set to a value used in the normal operation (S20).

Subsequently, the normal operation which is described above with reference to FIGS. 8A to 8E is performed. In the A-C axis gain adjustment, the gain of the moving amount of the actuator D is adjusted in the above-described example, however, the gain of the moving amount of the actuator B, instead of the actuator D, may be adjusted. In addition, in the B-D axis gain adjustment, the gain of the moving amount of the actuator C is adjusted as above, however, the gain of the moving amount of the actuator A, instead of the actuator C, may be adjusted.

Since the above-described adjustment is performed by the microcomputer 105, the intersection point of the A-C axis and the B-D axis is controlled to a predetermined position in the normal operation.

1-3. Effect, Etc.

The optical member driving apparatus 100 according to the present embodiment includes a parallel plate glass 1000, 1001 for changing an optical path, a plurality of actuators A to D having movable members 107a to 107d, respectively, each of the movable members 107a to 107d being controlled to move in one direction by a driving signal, a plurality of connecting members 106a to 106d which connect edge portions EA to ED of the parallel plate glass with the movable members 107a to 107d of the actuators, respectively, on an A-C axis and a B-D axis orthogonally intersecting to each other at a surface center position of the parallel plate glass, position detectors 102a to 102d and 103a to 103d for detecting moving amounts of the movable members of the plurality of actuators and outputting detection signals indicating the moving amounts, respectively, and a microcomputer 105 for controlling movement of the movable member of each of the plurality of actuators A to C based on the detection signals from the position detectors 102a to 102d and 103a to 103d so as to keep the intersection point (O) of the A-C and B-D axes at constant position.

By this configuration, the shifting amounts of the movable members of pairs of the actuators (A-C, B-D) are controlled, and thus it is possible to control inclination of the parallel plate glass 1000 about two axes (the A-C axis and the B-D axis) orthogonally intersect with each other. Thus, by applying signals for controlling the moving amounts in the horizontal and vertical directions to the two pairs of the actuators A-C and B-D, a projection image can be moved in horizontal and vertical directions. Therefore, a display apparatus operable to control easily a direction of move of a display position of an image can be realized.

In addition, since the single microcomputer 105 controls the four actuators A to D, it is possible to suppress breakage of the parallel plate glass caused by strain stress applied thereto and increasing of the driving power of the actuators caused by the increase of the load thereof resulting from that the shifting amount of one of two pairs of the actuators becomes different from that of the other pair.

Embodiment 2

Figure 12:
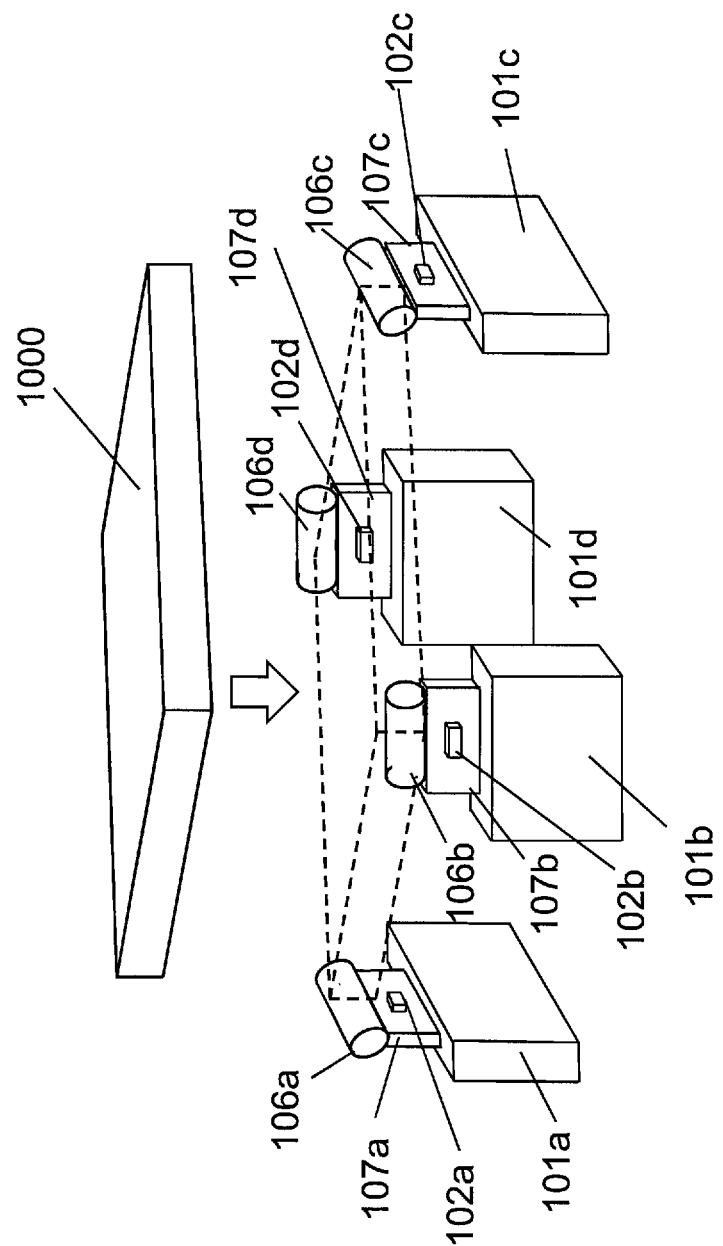
FIG. 12 is a diagram showing a configuration of an optical member driving apparatus according to Embodiment 2.

In Embodiment 1, as shown in FIG. 1, a configuration that the square shaped parallel plate glass 1000 for moving an incident light beam is supported at middle portions of the circumference edges of the parallel plate glass 1000, however, methods for supporting the parallel plate glass is not limited thereto. The parallel plate glass may be supported at axisymmetrical positions about the center of the parallel plate glass. For example, as shown in FIG. 12, the parallel plate glass 1000 may be supported at the corners. By this supporting method, the same effect as the supporting method shown in FIG. 1 can be also obtained.

Figure 13:
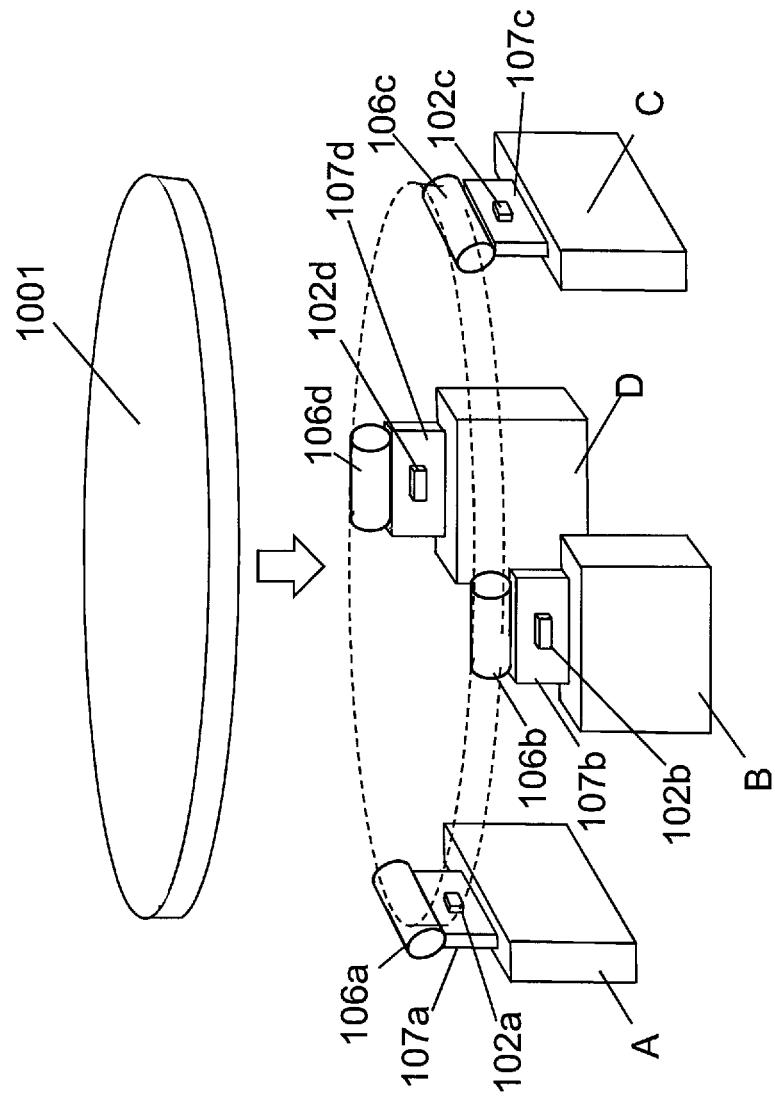
FIG. 13 is a drawing showing a configuration of the optical member driving apparatus according to Embodiment 2.

In addition, the shape of the parallel plate glass is not necessary to be square, and it may be circular as shown in FIG. 13. The circular parallel plate glass 1001 may be supported at positions indicated by dashed lines.

In addition, it is sufficient that the moment about axes which is orthogonal to each other and passes through the center point of the parallel plate glass is symmetrical about each axis. Therefore, in a case where a parallel plate glass has a shape which is asymmetrical about axes, a weight may be additionally mounted on the parallel plate glass to achieve a balance such that the moment about the axes is symmetrical. By this configuration, the same effect as the configuration of supporting middle portions of the edges of the square parallel plate glass is also obtained.

Figure 14A:
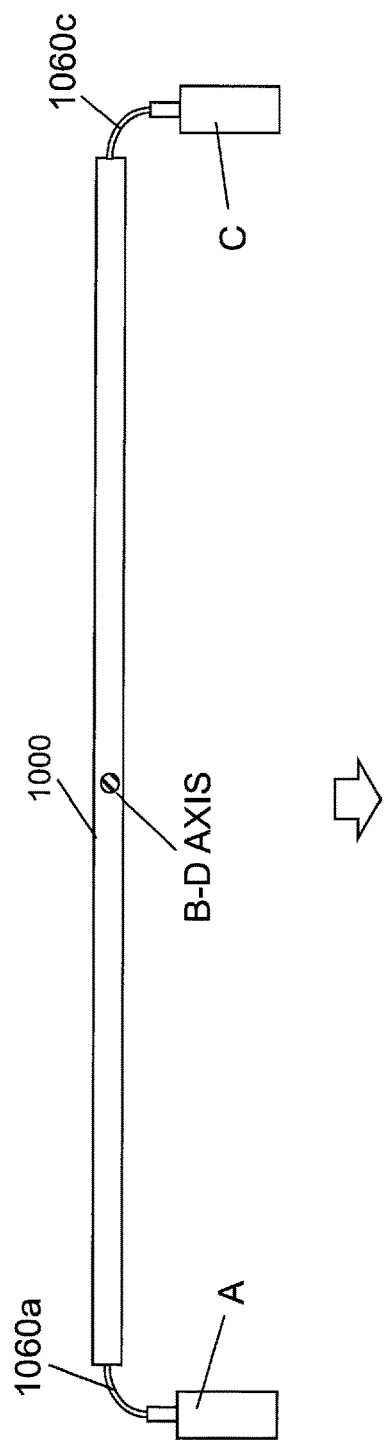
FIGS. 14A and 14B are drawings showing another example of connecting members of the optical member driving apparatus.
Figure 14B:
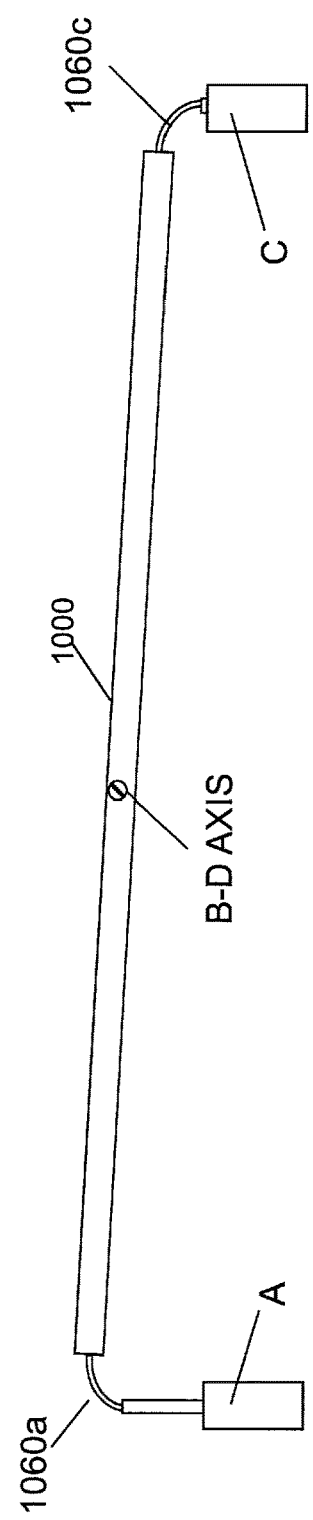

With reference to FIGS. 14A and 14B, another example of connecting members is described. Since the inclination of the parallel plate glass is rotational movement, a connecting member 106 connecting an actuator and the parallel plate glass shifts in a direction orthogonal to the center axis of the rotation. Accordingly, the actuators A to D are required to absorb position movement in this direction. According to the configuration of Embodiment 1, such shifting is absorbed by the small gap which exists between the movable member 107a to 107d of the actuator and the permanent magnet mounted in the main body of the actuator.

In the example shown in FIGS. 14A and 14B, an elastic member 1060a is used as a connecting member. In this configuration, the shifting is absorbed regardless of the structure of the actuator. Namely, the shifting in a direction orthogonal to the central axis of rotation is absorbed by deflection and twisting of the elastic member. As an elastic member, a metal piece having elasticity, such as steel having elasticity, or stainless-steel having elasticity may be used. By the use of such an elastic member, even if twisting about the rotational axis occurs, the elastic member returns to the original state by the elastic recovery capability. As shown in FIGS. 15A to 15D, several shapes of elastic members are available. FIGS. 15A to 15D show side views of elastic members. A thin elastic metal plate having a rectangular shaped cross-section can be formed in such shapes and used.

Embodiment 3

Figure 16:
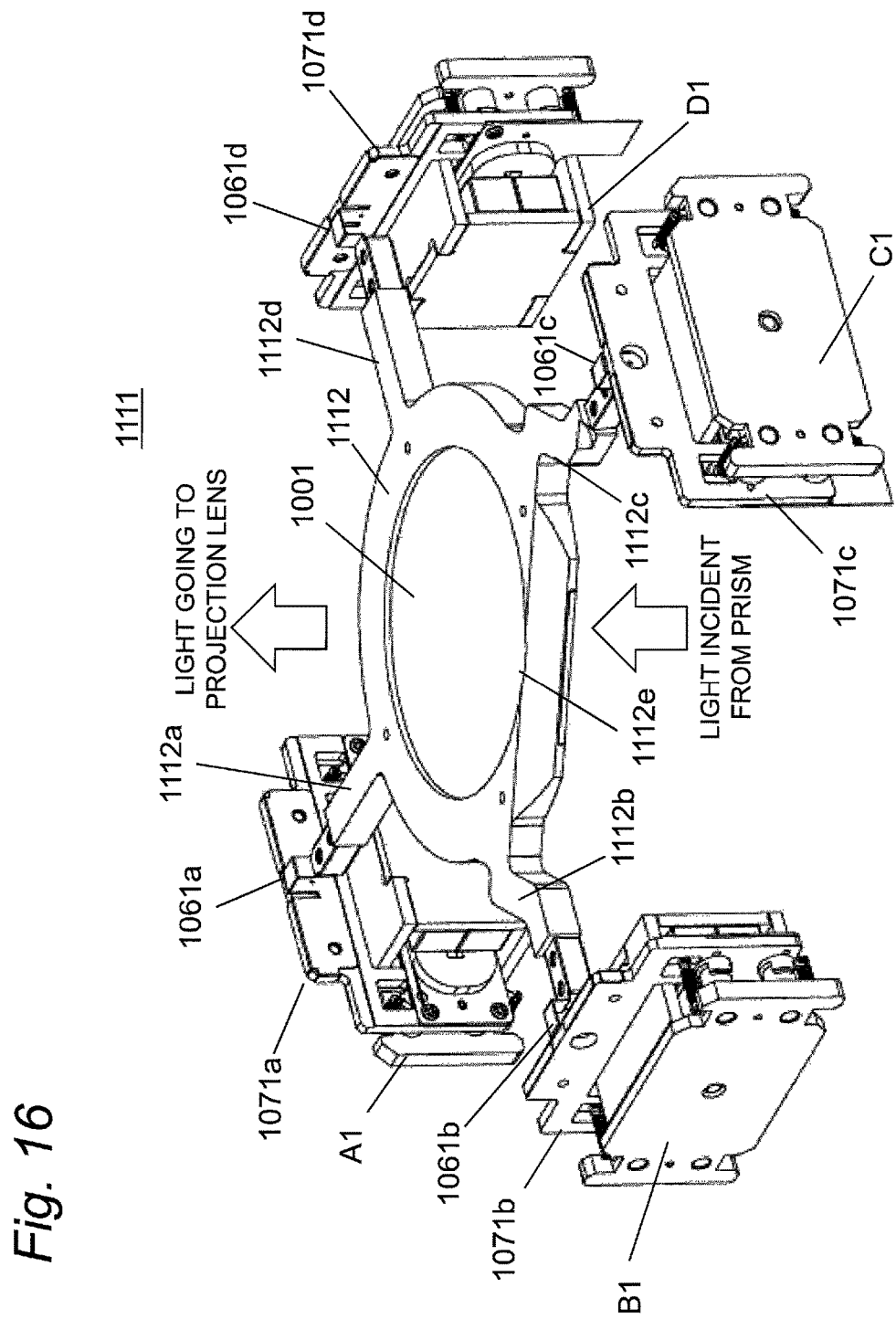
FIG. 16 is a drawing showing an optical member driving apparatus according to Embodiment 3.

FIG. 16 shows one example of a configuration of an optical member driving apparatus which is suitable for arrangement at a position where a sufficient space cannot be ensured on front and rear sides of the parallel plate glass, for example, at a front of a projection lens of a projector which is a projection type image display apparatus.

In an optical member driving apparatus 1111 as shown in FIG. 16, a parallel plate glass 1001 having a circular shape is mounted in an opening 1112e of an aluminum frame 1112. Arms 1112a and 1112c extending from the frame 1112 in the A-C axis direction of the parallel plate glass 1001 are formed, and arms 1112b and 1112d extending from the frame 1112 in the B-D axis direction of the parallel plate glass 1001 are formed. These arms 1112a to 1112d are connected to movable members 1071a to 1071d of voice coil actuators A1 to D1 through stainless-steel connecting members 1061a to 1061d having elasticity by using joining members such as screws.

Figure 17:
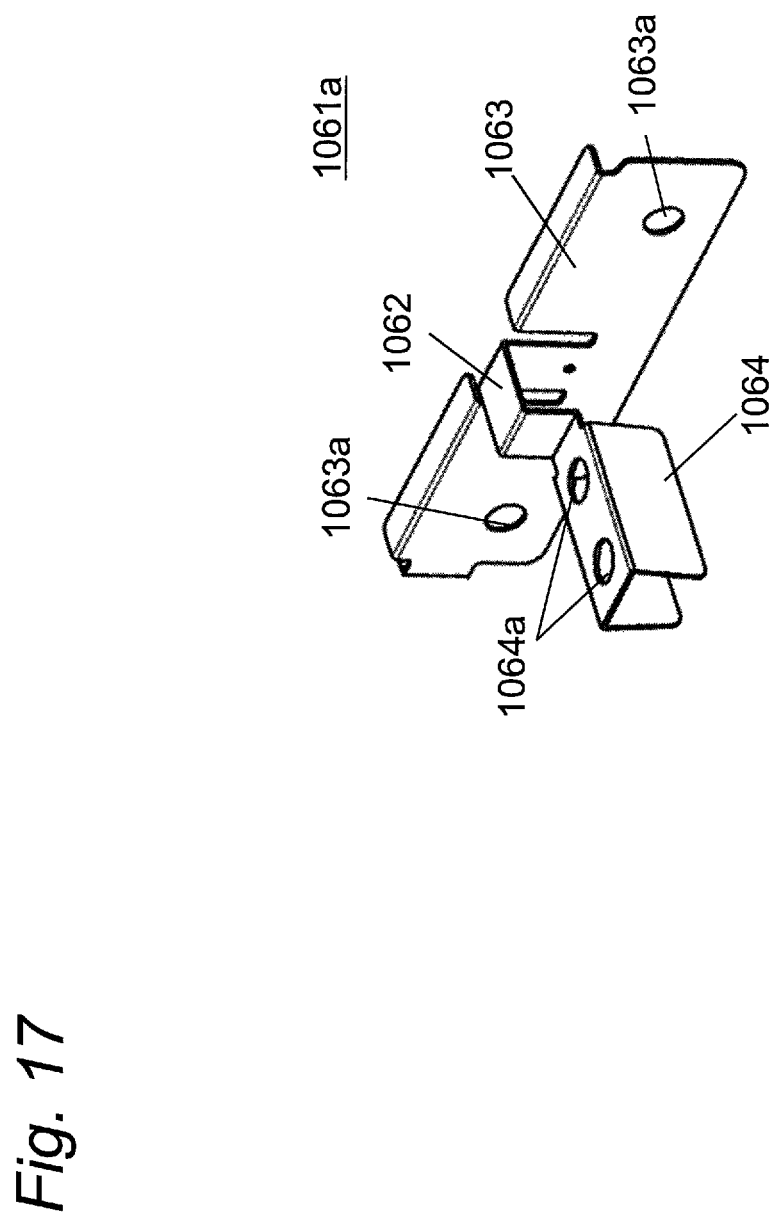
FIG. 17 is a drawing showing a connecting member used in the optical member driving apparatus according to Embodiment 3.

Since the connecting members 1061a to 1061d have the same structure, a structure of the connecting member 1061a is described below in detail. As shown in FIG. 17, the connecting member 1061a includes a first joining part 1063 having screw holes 1063a for connecting to the movable member 1071a with screws, a second joining part 1064 having screw holes 1064a for joining with the arm 1112a with screws, an elastically deformable elastic part 1062 for joining the first joining part 1063 and the second joining part 1064. The first joining part 1063, the second joining part 1064, and the elastic part 1062 are integrally formed of one piece of stainless-steel having elasticity.

When the actuators A1 to D1 cannot be mounted in a space in front or rear of the parallel plate glass 1001 because the space has small gap approximately up to the thickness of the parallel plate glass 1001, the size of the parallel plate glass 1001 needs to be larger. Since rotational movement of the parallel plate glass 1001 is performed about its center as an axis, the actuators A1 to D1 need to output larger driving power as the moment about the axis becomes larger. Further, to secure the inclination angle same as that of the smaller parallel plate glass 1001, the moving distance of the actuator A1 to D1 becomes large. Thus, the electric power for driving the actuators A1 to D1 becomes large and the reactive force for driving the parallel plate glass 1001 becomes large, resulting in large vibration of the supporting members for the actuators A1 to D1. In the structure as shown in FIG. 16 and FIG. 17, the length of the arms 1112a to 1112d and the length of the elastic part 1062 are shorten as much as possible, to avoid such problem.

Embodiment 4

The optical member driving apparatuses disclosed in the above embodiments can be applied to a projection type image display apparatus.

Figure 18:
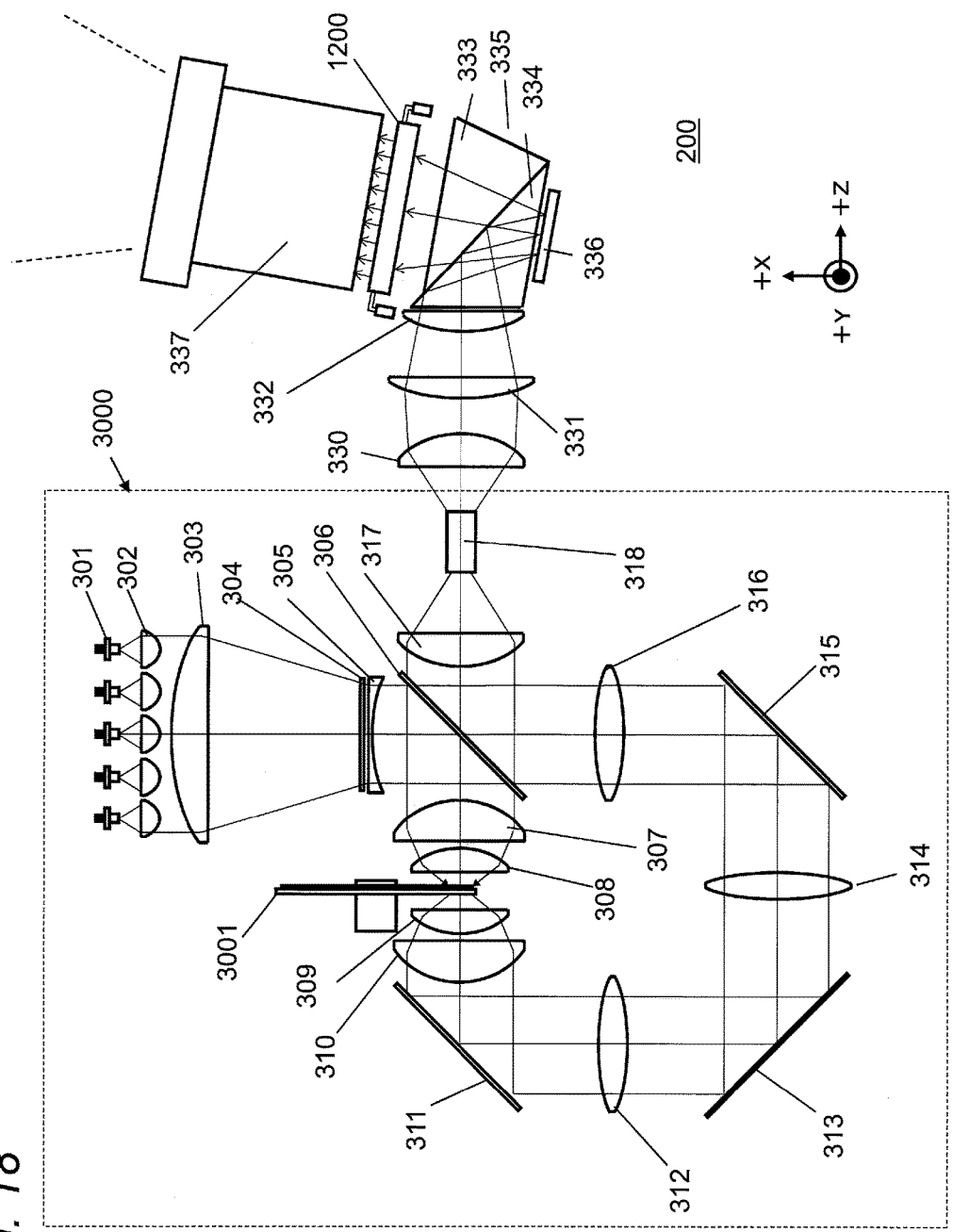
FIG. 18 is a drawing showing a configuration of a projection type image display apparatus including an optical member driving apparatus according to Embodiment 4.

FIG. 18 is a drawing for describing a configuration of an optical system of a projection type image display apparatus to which the idea of the optical member driving apparatus 100, 1111 of the present disclosure is applied. In the descriptions below, an XYZ orthogonal coordinate system as shown in FIG. 18 is fixed.

First, a lighting optical system 3000 of the projection type image display apparatus is described.

A laser light source includes a plurality of blue semiconductor lasers 301 for achieving high brightness of a lighting apparatus. Laser light emitted from each blue semiconductor laser 301 is collimated by a corresponding collimator lens 302. Light emitted from the collimate lens 302 is substantially parallel light. The all light flux is condensed by a condensing lens 303, passes through a diffuser plate 304, and then substantially parallelized again by a lens 305. The laser light flux substantially parallelized by the lens 305 enters a dichroic mirror 306 which is arranged at an angle of approximately 45 degrees from the light axis.

The diffuser plate 304 is a flat glass plate, on one side of which a diffusing surface with fine irregularities are formed. In addition, the dichroic mirror 306 has a characteristic that it reflects light in a wavelength range of the blue semiconductor lasers 301 and transmits light in other wavelength range.

The laser light which entered the dichroic mirror 306 in −X direction is reflected by the dichroic mirror 306 and emitted in −Z direction. Then, the laser light is condensed by condensing lenses 307 and 308, and excites a phosphor formed on a phosphor wheel 3001.

FIGS. 19A and 19B show a configuration of the phosphor wheel 3001. As shown in FIGS. 19A and 19B, the phosphor wheel 3001 includes a motor 3011 and a substrate 3012. In the substrate 3012, on a circular region which is distant from a rotation center of the phosphor wheel by a same distance, a first phosphor 3013, a second phosphor 3014, and an opening 3015 are formed. Mirror finish is applied on a surface on which the phosphor is formed, and therefore the surface reflects light.

The light condensed on the phosphor 3013 generates fluorescent light corresponding to the phosphor 3013. The phosphor 3013 is a red phosphor and it is excited by the light of the blue semiconductor lasers 301 to generate red light.

The light condensed on the phosphor 3014 generates fluorescent light corresponding to the phosphor 3014. The phosphor 3014 is a green phosphor and it is excited by the light of the blue semiconductor lasers 301 to generate green light.

Further, the light condensed in the opening 3015 (the light of the blue semiconductor lasers 301) passes through the opening 3015.

Referring back to FIG. 18, the red light and green light obtained by the phosphor wheel 3001 is emitted from the phosphor wheel 3001. These red light and green light are parallelized by the lenses 308 and 307, passes through the dichroic mirror 306, condensed by a condensing lens 317, and then enters into a rod integrator 318.

On the other hand, the blue light of the blue semiconductor lasers 301 which has passed through the opening 3015 travels through lenses 309 and 310, a mirror 311, a lens 312, a mirror 313, a lens 314, a mirror 315, and a lens 316. The light is then reflected by the dichroic mirror 306, condensed by the condensing lens 317, and enters the rod integrator 318. Lenses 312, 314, and 316 function as a relay lens.

The light emitted from the rod integrator 318 passes through lenses 330, 331, and 332, and enters a total reflection prism 335 consisting of a pair of prisms 333 and 334. The incident light is modulated by a DMD (Digital Mirror Device) 336 which is an optical modulation device based on a video image signal, and then emitted as an image light. The lenses 330 and 331 have a function of a relay lens, and the lens 332 functions to image the light from the emission surface of the rod integrator 318 onto the DMD 336.

The image light emitted from the DMD 336 enters an optical member driving apparatus 1200. The optical member driving apparatus 100, 1111 disclosed in the above-described embodiments may be used as the present optical member driving apparatus 1200. The light which has passed through the optical member driving apparatus 1200 enters the projection lens 337, and the emitted light from the projection lens 337 is magnified and projected onto a screen as an image light.

With a function of moving a display position of the image light of the optical member driving apparatus 1200, a wobbling display can be performed by the projection type image display apparatus. Here, the wobbling display is a method of displaying different images while shifting the display position multiple times during one-frame period of the input image, so as to obtain an effect of improving resolution of the displayed image. Further, in the projection type image display apparatus, the function is applicable to a displaying method of shifting and displaying the same image within one-frame period of the input image such that areas between one displayed pixel and another displayed pixel on which no image is displayed is eliminated so as to smoothly display the image. Alternatively, it is applicable to shake correction by detecting blurring of an image caused by vibration of a projector and correcting the detected blurring.

Other Embodiments

As described above, Embodiments 1 to 4 are described as above as examples of arts disclosed in the present application. However, the arts in the present disclosure is not limited thereto, and can be applied to embodiments in which modification, substitution, addition, omission and the like are applied as necessary. Further, some of the components described in Embodiments 1 to 4 can be combined to provide a new embodiment.

In the embodiments described above, in the initial adjustment process shown in the flowchart of FIG. 10, the method of origin adjustment is not limited to the above-described method (Step S11 to S13). The following method is conceivable. For example, the three actuators A to C are controlled to a position with the shifting amount of zero, namely to the reference position, and the position where the rest actuator D locates as it is set to the reference position of the actuator D. In this case, at the origin adjustment, it is not necessary to set a positioning servo gain to a small value as performed at Step S10. However, at the A-C axis adjustment and B-D axis adjustment after the origin adjustment, it is necessary to set the positioning servo gain to a value smaller than the value at the time of the normal operation.

Further, in the initial adjustment process, the order of the actuators to be controlled is not limited to the example described above. The actuators A and C may be first controlled to maximally shifted positions and a correction gain of the actuator A or C may be determined, and then the actuators B and D may be controlled to maximally shifted positions and a correction gain of the actuator B or D may be determined.

Further, when there is no difference among the detection sensitivity of the position sensors 102a to 102d, it is not necessary to perform the A-C axis gain adjustment and B-D axis gain adjustment. In this case, in the initial adjustment process, only the origin adjustment process (S11 to S13) may be performed. The origin adjustment can correct the reference position of each actuator, to suppress strain stress to be applied to the parallel plate glass and increase of driving electric power which are caused by variations of the actuators and so on.

Further, in the A-C axis gain adjustment and B-D axis gain adjustment, each of the actuators A to D is controlled to the maximum shifting value position. However, the moving amount is not limited to the maximum shifting amount. The actuators A-C and B-D facing to each other may be driven to perform movement in opposite directions to each other by the same moving amount.

In the present disclosure, the parallel plate glasses 1000 and 1001 are examples of an optical member. The voice coil motors are examples of actuators. The position detection circuits 103 are examples of a position detector. The microcomputer 105 is an example of a controller. The present disclosure discloses a technical idea as follows. Reference numerals in parentheses corresponding to respective components are indicated for a purpose of reference, and these are not intended to limit the scope of the components.

(1) An optical member driving apparatus (100) includes:

an optical member (1000, 1001) for changing an optical path;

a plurality of actuators (A to D) each having a movable member which is controlled to move in one direction;

a plurality of connecting members (106a to 106d) which connects edge portions (EA, EB, EC, ED) of the optical member on two axes orthogonal to each other and the movable members (107a to 107d) of the plurality of actuators, respectively;

a position detector (102a to 102d, and 103a to 103d) for detecting a moving amount of the movable member of each actuator and outputting a detection signal indicating the moving amount; and a controller (105) for controlling movement of the movable member of each actuator (A to C) based on the detection signal from the position detector so as to keep an intersection point (O) of the two axes at constant position.

According to this configuration, an image can be moved in two directions orthogonal to each other by simple control.

(2) The plurality of actuators may include first to fourth actuators (A to D). The first and second actuators are mounted on edge portions of the optical member which face to each other on one of the two axes, respectively. The third and fourth actuators are mounted on edge portions of the optical member which face each other on the other axis of the two axes, respectively.

(3) The controller (105) may control positions of the movable members of at least three actuators among the first to fourth actuators (A to D) to the corresponding reference positions during initial adjustment of the actuators, and then the controller (105) may set the position of one actuator among the first to fourth actuators at which driving power of the one actuator is minimum, as a setting value of the reference position of the movable member for the one actuator (Steps S11 to S13 of FIG. 10). By this configuration, the reference position of each actuator can be corrected, and it is possible to suppress generation of strain stress applied to the parallel plate glass and increasing of driving electric power, which are caused by variations of the actuators and so on.

(4) In the optical member driving apparatus according to (2) or (3), in the initial adjustment of the actuators, the controller (105) may control the movable members of the first and second actuators to move in opposite directions to each other by a predetermined amount, determine driving power of the third and fourth actuators while adjusting a gain of the detection signal from the position detector, and detect a value of the gain (correction gain) which minimizes a difference between a total of driving power of the third and fourth actuators before the first and second actuators are moved in the opposite directions to each other by the predetermined amount and a total of driving power of the third and fourth actuators after the first and second actuators are moved in the opposite directions by the predetermined amount, and in the normal operation, the controller may set the detected gain to a gain of the detection signal from the position detector (Steps S14 to S15 or S17 to S18 of FIG. 10). By this configuration, influence of errors of detection sensitivity of the position detector among the actuators can be reduced.

(5) In the optical member driving apparatus according to (4), in the initial adjustment of the actuators, the controller may control the movable members of the third and fourth actuators in opposite directions to each other by a predetermined amount, determine driving power of the first and second actuators while adjusting a gain of the detection signal from the position detector, and detect a value of the gain (correction gain) which minimizes a difference between a total of driving power of the first and second actuators before the third and fourth actuators are moved in the opposite direction to each other by the predetermined amount and a total of driving power of the first and second actuators after the third and fourth actuators are moved in the opposite direction to each other by the predetermined amount, and in the normal operation, the controller may set the detected gain to a gain of detection signal from the position detector (Steps S14 to S15 or S17 to S18 of FIG. 10). By this configuration, influence of errors of detection sensitivity of the position detector of among the actuators can be reduced.

(6) In the optical member driving apparatus, the actuator may be a voice coil motor.

(7) The connecting member may be formed of an elastic members.

(8) The controller may be include a single microcomputer.

(9) The optical member is, for example, circular or square parallel plate glass.

(10) A projection type image display apparatus (200) includes:

a light source (3000);

an optical modulation device (336) for modulating light from the light source by a video signal;

a projection optical system (337) for magnifying and projecting the light modulated by the optical modulation device; and the optical member driving apparatus (200) having a configuration of any one of (1) to (9) which is arranged between the optical modulation device and the projection optical system.

As described above, the embodiments are described as examples of the arts in the present disclosure. For this purpose, the accompanying drawings and the detailed descriptions are provided.

Accordingly, the components described in the accompanying drawings and the detailed description may include not only components which are necessary to solve the problem, but also components which are unnecessary to solve the problem for exemplifying the art described above. Therefore, it should not immediately be construed that such unnecessary components are necessary as the unnecessary components are described in the accompanying drawings or the detailed description.

In addition, the embodiments as described above are for exemplifying the art in the present disclosure, and therefore, the embodiments can be applied various kinds of modifications, substitutions, additions, omissions, and so on, provided that they fall within the scope of the claims or equivalents thereof.

INDUSTRIAL APPLICABILITY

The present disclosure is applicable to a projection type display apparatus (for example, a projector) which displays a high resolution image by displaying an image while shifting display positions of pixels.

The invention claimed is:

1. An optical member driving apparatus comprising:
an optical member for changing an optical path;
first to fourth actuators, each having a movable member which is controlled to move in one direction;
a plurality of connecting members which connect edge portions of the optical member positioned on two axes orthogonal to each other and the movable members of the first to fourth actuators, respectively;
a position detector for detecting a moving amount of the movable member of each actuator and outputting a detection signal indicating the moving amount; and
a controller for controlling movement of the movable member of each actuator based on the detection signal from the position detector so as to keep an intersection point of the two axes at constant position;
wherein the first and second actuators are mounted on one of the two axes and on the edge portions of the optical member;
wherein the third and fourth actuators are mounted on the other of the two axes and on the edge portions of the optical member; and
wherein, in initial adjustment of the actuators, the controller
controls the movable members of the first and second actuators to move in opposite direction to each other by a predetermined amount,
determines driving power of the third and fourth actuators while adjusting a gain of the detection signal from the position detector, and
detects a value of the gain which minimizes a difference between a total of driving power of the third and fourth actuators before the first and second actuators are moved in the opposite direction to each other by the predetermined amount and a total of driving power of the third and fourth actuators after the first and second actuators are moved in the opposite direction to each other by the predetermined amount, and
in normal operation, the controller sets the detected gain to a gain of the detection signal from the position detector.

2. The optical member driving apparatus according to claim 1, wherein, in the initial adjustment of the actuators, the controller further
controls the movable members of the third and fourth actuators in opposite direction to each other by a predetermined amount,
determines driving power of the first and second actuators while adjusting a gain of the detection signal from the position detector, and
detects a value of the gain which minimizes a difference between a total of driving power of the first and second actuators before the third and fourth actuators are moved in the opposite direction to each other by the predetermined amount and a total of driving power of the first and second actuators after the third and fourth actuators are moved in the opposite direction to each other by the predetermined amount, and
in the normal operation, the controller sets the detected gain to a gain of detection signal from the position detector.

3. The optical member driving apparatus according to claim 1, wherein the actuator is a voice coil motor.

4. The optical member driving apparatus according to claim 1, wherein the connecting member is an elastic member.

5. The optical member driving apparatus according to claim 1, wherein the controller includes a single microcomputer.

6. The optical member driving apparatus according to claim 1, wherein the optical member is a circular parallel plate glass.

7. The optical member driving apparatus according to claim 1, wherein the optical member is a square parallel plate glass.

8. A projection type image display apparatus comprising:
a light source;
an optical modulation device for modulating light from the light source with a video signal;

a projection optical system for magnifying and projecting the light modulated by the optical modulation device; and the optical member driving apparatus according to claim 1, which is arranged between the optical modulation device and the projection optical system.

9. The optical member driving apparatus according to claim 1, wherein the first and second actuators are mounted on one of the two axes and on the edge portions of the optical member, facing each other with respect to the intersection point of the two axes.

10. The optical member driving apparatus according to claim 1, wherein the third and fourth actuators are mounted on the other of the two axes and on the edge portions of the optical member, facing each other with respect to the intersection point of the two axes.

\* \* \* \* \*